(12) United States Patent
Yamamoto et al.

(10) Patent No.: US 6,731,826 B1
(45) Date of Patent: May 4, 2004

(54) IMAGE SEARCH APPARATUS AND METHOD, AND COMPUTER READABLE MEMORY

(75) Inventors: Kunihiro Yamamoto, Yokohama (JP); Kentaro Matsumoto, Higashikurume (JP); Miyuki Enokida, Yokohama (JP); Kiyoshi Kusama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,430

(22) Filed: Aug. 30, 1999

(30) Foreign Application Priority Data

| Aug. 31, 1998 | (JP) | 10-244579 |
| Aug. 31, 1998 | (JP) | 10-244580 |
| Aug. 31, 1998 | (JP) | 10-244582 |
| Aug. 31, 1998 | (JP) | 10-244583 |
| Aug. 31, 1998 | (JP) | 10-244585 |
| Jul. 28, 1999 | (JP) | 11-214266 |

(51) Int. Cl.⁷ .................... G06K 9/54
(52) U.S. Cl. .......... 382/305; 382/209; 382/187; 382/218; 358/403; 707/3; 707/6
(58) Field of Search ............... 382/181, 187, 382/189, 202, 209, 218, 219, 220, 278, 298, 305; 345/700, 835, 838; 358/403; 707/1–7

(56) References Cited

U.S. PATENT DOCUMENTS

| 5,038,298 A | | 8/1991 | Matsumoto et al. ......... 358/401 |
| 5,060,280 A | | 10/1991 | Mita et al. ................... 382/283 |
| 5,157,773 A | | 10/1992 | Matsumoto et al. ......... 345/520 |
| 5,444,550 A | | 8/1995 | Enokida et al. .............. 358/453 |
| 5,579,471 A | * | 11/1996 | Barber et al. ................ 345/700 |
| 5,586,198 A | * | 12/1996 | Lakritz ........................ 382/185 |
| 5,751,286 A | | 5/1998 | Barber et al. ................ 345/348 |
| 5,805,746 A | * | 9/1998 | Miyatake et al. ............ 382/305 |
| 5,809,498 A | * | 9/1998 | Lopreati et al. ............. 707/6 |
| 5,873,076 A | * | 2/1999 | Barr et al. ................... 707/3 |
| 5,913,205 A | * | 6/1999 | Jain et al. ................... 707/2 |
| 5,991,780 A | * | 11/1999 | Rivette et al. .............. 707/512 |
| 5,999,664 A | * | 12/1999 | Mahoney et al. ........... 382/305 |
| 6,324,536 B1 | * | 11/2001 | Rofrano ...................... 707/5 |
| 6,415,282 B1 | * | 7/2002 | Mukherjea et al. .......... 707/3 |
| 6,463,426 B1 | * | 10/2002 | Lipson et al. ............... 707/3 |

OTHER PUBLICATIONS

Chua, et al "Fast signature–based color–spatial image retrieval", IEEE, 1997,pp. 362–369.*
Kato, et al. "A sketch retrieval method for full color image database query by visual example", IEEE, 1992, pp. 530–533.*
Srihari "Automatic indexing and content–based retrieval of captioned images", IEEE, 1995, pp. 49–56.*
Soffer, et al. "Pictorial queries by image similarity", IEEE, 1996, pp. 114–119.*
Lee et al., *Query by Image Content Using Multiple Objects and Multiple Features: User Interface Issues*, IEEE Comp. Soc. Press, vol. 2, pp. 76–80 (1994).
Ashley et al., *The Query by Image Content (QBIC) System*, Sigmod Record, Assn. for Comp. Mach., vol 24, No. 2, p. 475 (1995).
Smith et al., *Tools and Techniques for Color Image Retrieval*, Proc. of SPIE, vol. 2670, pp. 426–437 (1996).
Gudivada et al., *An Architecture for and Query Processing in Distributed Content–based Image Retrieval*, Academic Press Limited, vol. 2, No. 3, pp. 139–152 (1996).

* cited by examiner

*Primary Examiner*—Daniel Mariam
(74) *Attorney, Agent, or Firm*—Fitzpatrick, Cella, Harper & Scinto

(57) ABSTRACT

A plurality of image data are stored in a hard disk device in correspondence with their image feature amounts. An image is using an input window. A CPU computes the image feature amount of the input image. The CPU computes image similarity on the basis of the computed image feature amount and the image feature amounts of the stored image data.

44 Claims, 23 Drawing Sheets

IMAGE SEARCH APPARATUS AND METHOD, AND COMPUTER READABLE MEMORY

BACKGROUND OF THE INVENTION

The present invention relates to an image search apparatus and method for searching an image database that stores a plurality of image data for desired image data, and a computer readable memory.

Various image search apparatuses for searching databases which store a large number of image data for desired image data have been proposed. The search methods used in these image search apparatuses are roughly classified into two methods:

a method of storing non-image information such as keywords, photographing dates, and the like in association with image data, and conducting a search based on such information; and a method of conducting a search on the basis of the image feature amounts (luminance/color difference information, image frequency, histogram, and the like) of image data itself.

In the latter method, a method of submitting certain image data, and searching image data using the image feature amounts of that image data as query keys is called similar image search. This method can effectively provide a search interface which is friendly to a user who has no special knowledge about image processing.

However, when the user has no image data that serve as keys, e.g., when a search is made on the basis of user's memory or an image idea designed by the user himself or herself, a user interface of the type using similar image search is very difficult to use. Or in some cases such interface cannot be used at all.

Alternatively, the user must acquire image data which serve as keys by some method. For example, the user must retrieve image data which can serve as keys by a search using keywords, and must then conduct a similar image search using the retrieved image data as keys, resulting in troublesome operations.

SUMMARY OF THE INVENTION

The present invention has been made in consideration of the conventional problems, and has as its object to provide an image search apparatus and method which can efficiently make an image search by quickly reflecting user's will, and a computer readable memory.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means; and image similarity computing means for computing image similarity on the basis of the image feature amount computed by the image feature amount computing means, and the image feature amounts of the image data stored in the storage means.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the image feature amount computing step of computing an image feature amount of an image input on an input window; and the image similarity computing step of computing image similarity on the basis of the image feature amount computed in the image feature amount computing step, and the image feature amounts of the image data stored in the storage medium in the storage step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the image feature amount computing step of computing an image feature amount of an image input on an input window; and a program code of the image similarity computing step of computing image similarity on the basis of the image feature amount computed in the image feature amount computing step, and the image feature amounts of the image data stored in the storage medium in the storage step.

In order to achieve the above object, an image search apparatus according to the present invention comprises the following arrangement.

That is, an image search apparatus for, searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means; and display control means for controlling to display the input window and a display window displayed by the image display means on a single screen of a display unit.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the image feature amount computing step of computing an image feature amount of image input on an input window;

the image similarity computing step of computing image similarity on the basis of the image feature amount computed in the image feature amount computing step, and the image feature amounts of the image data stored in the storage medium;

the image display step of displaying a list of image data as search results on the basis of the image similarity computed in the image similarity computing step; and the display control step of controlling to display the input window and a display window displayed in the image display step on a single screen of a display unit.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the image feature amount computing step of computing an image feature amount of image input on an input window;

a program code of the image similarity computing step of computing image similarity on the basis of the image feature amount computed in the image feature amount computing step, and the image feature amounts of the image data stored in the storage medium;

a program code of the image display step of displaying a list of image data as search results on the basis of the image similarity computed in the image similarity computing step; and a program code of the display control step of controlling to display the input window and a display window displayed in the image display step on a single screen of a display unit.

In order to achieve the above object, an image search apparatus according to the present invention comprises the following arrangement.

That is, an image search apparatus for searching an image database that stores a plurality of image data for desired image data, comprises:

management means for managing the plurality of image data in correspondence with image feature amounts of the image data;

input means for inputting an image which is used as a first query criteria using an input window;

image feature amount computing means for computing a first image feature amount of the image used as the first query criteria;

image similarity computing means for computing image similarity on the basis of the first image feature amount and the image feature amounts of the image data managed by the management means;

image display means for displaying a list of image data as search results on the basis of the image similarity computed by the image similarity computing means; and determination means for determining on the basis of a second image feature amount of an image used as a second query criteria which is input by the input means when a research is made by modifying the first query criteria, and the first image feature amount, whether or not the image similarity computing means and the image display means are executed.

In order to achieve the above object, an image search method according to the present invention comprises the following arrangement.

That is, an image search method for searching an image database that stores a plurality of image data for desired image data, comprises:

the management step of managing the plurality of image data in a storage medium in correspondence with image feature amounts of the image data;

the image feature amount computing step of computing a first image feature amount of an image which is input on an input window and is used as a first query criteria;

the image similarity computing step of computing image similarity on the basis of the first image feature amount and the image feature amounts of the image data managed in the storage medium in the management step;

the image display step of displaying a list of image data as search results on the basis of the image similarity computed in the image similarity computing step; and the determination step of determining on the basis of a second image feature amount of an image used as a second query criteria which is input on the input window when a research is made by modifying the first query criteria, and the first image feature amount, whether or not the image similarity computing step and the image display step are executed.

In order to achieve the above object, a computer readable memory according to the present invention comprises the following arrangement.

That is, a computer readable memory that stores a program code of an image search for searching an image database that stores a plurality of image data for desired image data, comprises:

a program code of the management step of managing the plurality of image data in a storage medium in correspondence with image feature amounts of the image data;

a program code of the image feature amount computing step of computing a first image feature amount of an image which is input on an input window and is used as a first query criteria;

a program code of the image similarity computing step of computing image similarity on the basis of the first image feature amount and the image feature amounts of the image data managed in the storage medium in the management step;

a program code of the image display step of displaying a list of image data as search results on the basis of the image similarity computed in the image similarity computing step; and a program code of the determination step of determining on the basis of a second image feature amount of an image used as a second query criteria which is input on the input window when a research is made by modifying the first query criteria, and the first image feature amount, whether or not the image similarity computing step and the image display step are executed.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means; and interruption means for interrupting the display by the image display means.

In order to achieve the above object, an image search method according to the present invention comprises the following arrangement.

That is, an image search method for searching an image database that stores a plurality of image data for desired image data, comprises:

the storage step of storing the plurality of image data in a storage medium in correspondence with image feature amounts of the image data;

the image feature amount computing step of computing an image feature amount of an image input on an input window;

the image similarity computing step of computing image similarity on the basis of the image feature amount computed in the image feature amount computing step, and the image feature amounts of the image data stored in the storage medium in the storage step;

the image display step of displaying a list of image data as search results on the basis of the image similarity computed in the image similarity computing step; and the interruption step of interrupting the display in the image display step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a storage medium in correspondence with image feature amounts of the image data;

a program code of the image feature amount computing step of computing an image feature amount of an image input on an input window;

a program code of the image similarity computing step of computing image similarity on the basis of the image feature amount computed in the image feature amount computing step, and the image feature amounts of the image data stored in the storage medium in the storage step;

a program code of the image display step of displaying a list of image data as search results on the basis of the image similarity computed in the image similarity computing step; and a program code of the interruption step of interrupting the display in the image display step.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image using an input window;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means; and cache means for caching image data displayed once by the image display means.

In order to achieve the above object, an image search method according to the present invention comprises the following arrangement.

That is, an image search method for searching an image database that stores a plurality of image data for desired image data, comprises:

the storage step of storing the plurality of image data in a first storage medium in correspondence with image feature amounts of the image data;

the image feature amount computing step of computing an image feature amount of the image input on an input window;

the image similarity computing step of computing image similarity on the basis of the image feature amount computed in the image feature amount computing step, and the image feature amounts of the image data stored in the first storage medium in the storage step;

the image display step of displaying a list of image data as search results on the basis of the image similarity computed in the image similarity computing step; and the cache step of caching, in a second storage medium, image data displayed once in the image display step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a first storage medium in correspondence with image feature amounts of the image data;

a program code of the image feature amount computing step of computing an image feature amount of the image input on an input window;

a program code of the image similarity computing step of computing image similarity on the basis of the image feature amount computed in the image feature amount computing step, and the image feature amounts of the image data stored in the first storage medium in the storage step;

a program code of the image display step of displaying a list of image data as search results on the basis of the image similarity computed in the image similarity computing step; and a program code of the cache step of caching, in a second storage medium, image data displayed once in the image display step.

In order to achieve the above object, an image search apparatus according to the present invention comprises the following arrangement.

That is, an image search apparatus for searching an image database that stores a plurality of image data for desired image data, comprises:

storage means for storing the plurality of image data in correspondence with image feature amounts of the image data;

input means for inputting an image;

image feature amount computing means for computing an image feature amount of the image input by the input means;

image similarity computing means for computing image similarity on the basis of the image feature amount computed by the image feature amount computing means, and the image feature amounts of the image data stored in the storage means;

image display means for displaying a list of image data as search results on the basis of the image similarity computed by the image similarity computing means;

discrimination means for discriminating whether or not image data to be displayed by the image display means is image data which has already been displayed in a previous display process; and control means for controlling the display by the image display means on the basis of a discrimination result of the discrimination means.

In order to achieve the above object, an image search method according to the present invention comprises the following arrangement.

That is, an image search method for searching an image database that stores a plurality of image data for desired image data, comprises:

the storage step of storing the plurality of image data in a first storage medium in correspondence with image feature amounts of the image data;

the image feature amount computing step of computing an image feature amount of an input image;

the image similarity computing step of computing image similarity on the basis of the image feature amount computed in the image feature amount computing step, and the image feature amounts of the image data stored in the first storage medium in the storage step;

the image display step of displaying a list of image data as search results on the basis of the image similarity computed in the image similarity computing step;

the discrimination step of discriminating whether or not image data to be displayed in the image display step is image data which has already been displayed in a previous display process; and the control step of controlling the display in the image display step on the basis of a discrimination result in the discrimination step.

In order to achieve the above object, a computer readable memory according to the present invention comprises the following arrangement.

That is, a computer readable memory that stores a program code of an image search for searching an image database that stores a plurality of image data for desired image data, comprises:

a program code of the storage step of storing the plurality of image data in a first storage medium in correspondence with image feature amounts of the image data;

a program code of the image feature amount computing step of computing an image feature amount of an input image;

a program code of the image similarity computing step of computing image similarity on the basis of the image feature amount computed in the image feature amount computing step, and the image feature amounts of the image data stored in the first storage medium in the storage step;

a program code of the image display step of displaying a list of image data as search results on the basis of the image similarity computed in the image similarity computing step;

a program code of the discrimination step of discriminating whether or not image data to be displayed in the image display step is image data which has already been displayed in a previous display process; and a program code of the control step of controlling the display in the image display step on the basis of a discrimination result in the discrimination step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described in detail hereinafter with reference to the accompanying drawings.

First Embodiment

Figure 1:
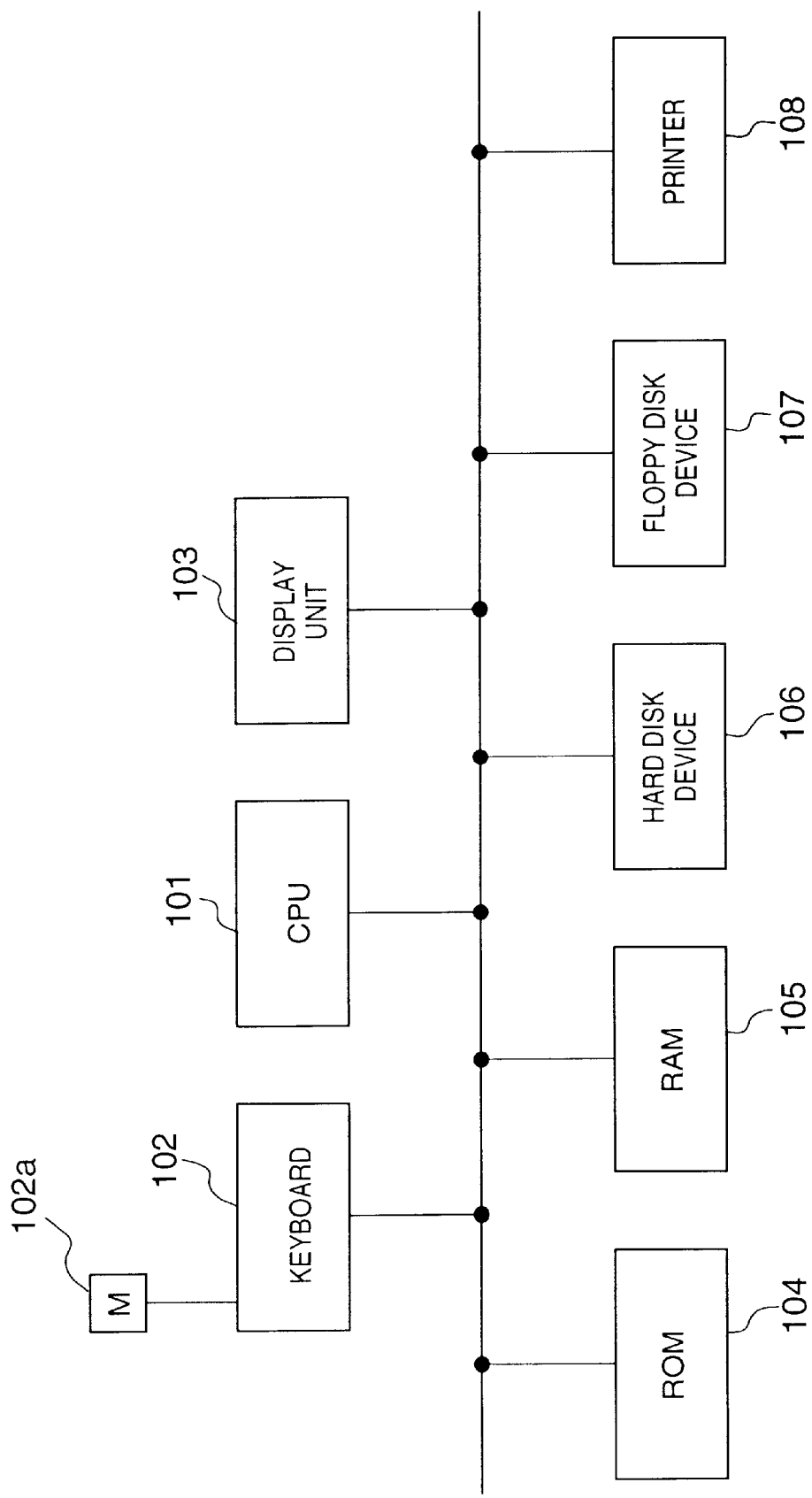
FIG. 1 is a block diagram showing the arrangement of an image search apparatus according to the first embodiment of the present invention.

FIG. 1 is a block diagram showing the arrangement of an image search apparatus according to the first embodiment.

Referring to FIG. 1, reference numeral 101 denotes a CPU for controlling the entire system. Reference numeral 102 denotes a keyboard; and 102a, a pointing device (mouse). The keyboard 102 is used together with the mouse for inputting data into the system and drawing an illustration which is used as a query criteria for a similar image search. Reference numeral 103 denotes a display unit which comprises a CRT, liquid crystal display, or the like, and displays a user interface used for drawing an image serving as a query criteria, and image data as a search result. Reference numeral 104 denotes a ROM; and 105, a RAM. These ROM and RAM construct a memory device of the system, and store programs executed by the system and data used by the system. Reference numeral 106 denotes a hard disk device; and 107, a floppy disk device. The hard disk device and floppy disk device construct an external storage device used as a file system of the system. The hard disk device 106 stores a plurality of image data serving as test images. Reference numeral 108 denotes a printer for recording an image or the like displayed on the display unit 103 on a recording medium.

An outline of the processes executed by the image search apparatus of the first embodiment will be described below with reference to FIG. 2.

Figure 2:
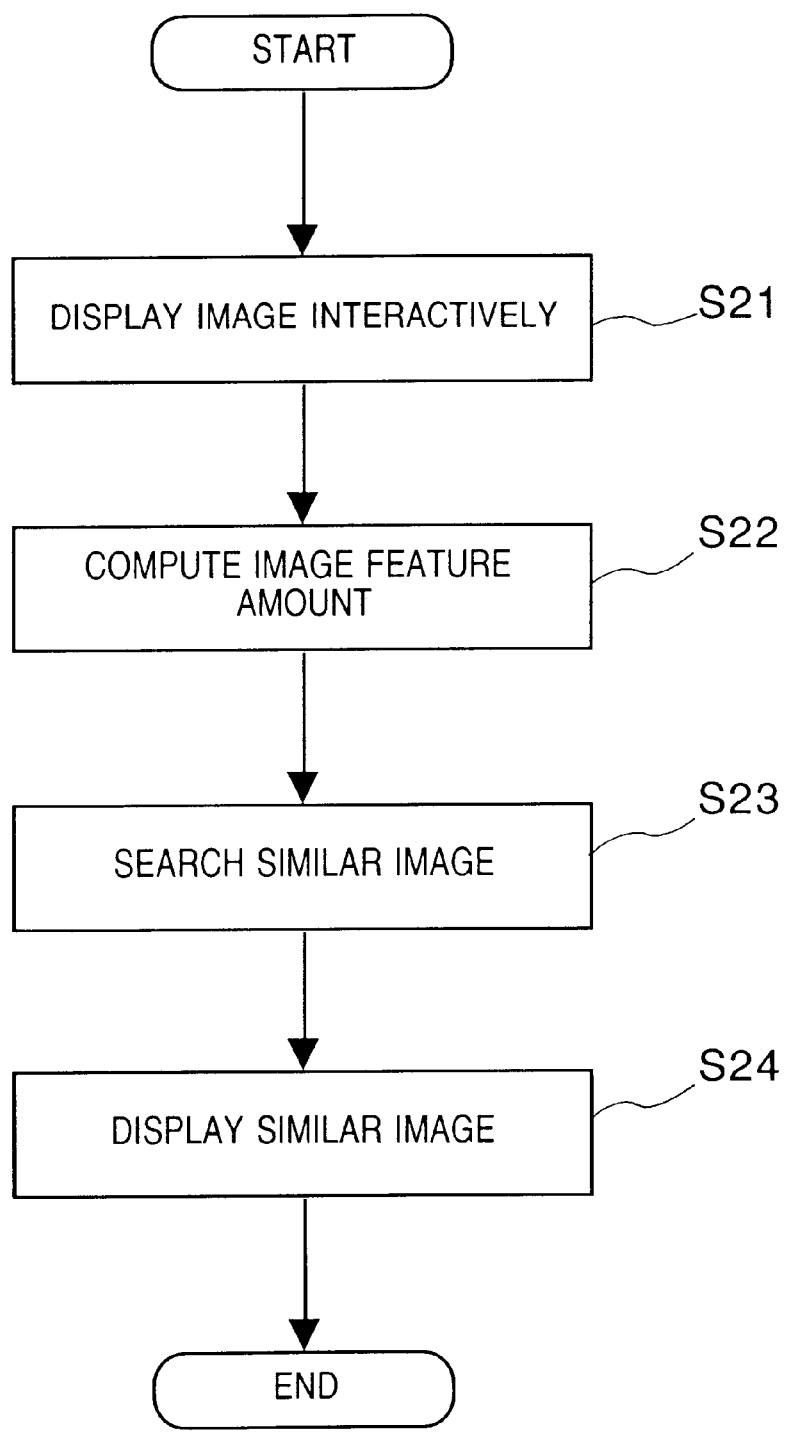
FIG. 2 is a flow chart showing an outline of the processes executed by the image search apparatus of the first embodiment.

FIG. 2 is a flow chart showing an outline of the processes executed by the image search apparatus of the first embodiment.

In step S21, the user draws an illustration, which is similar to the image data wanted and stored on the hard disk device 106, and is used as a query criteria, on the display unit 103. In step S22, the image feature amount of the drawn illustration is computed. In step S23, a similar image search is made based on the computed image feature amount. In step S24, similar images found by the search are displayed on the display unit 103.

The processes executed in the individual steps will be described in detail below.

<Description of Step S21>

Figure 3:
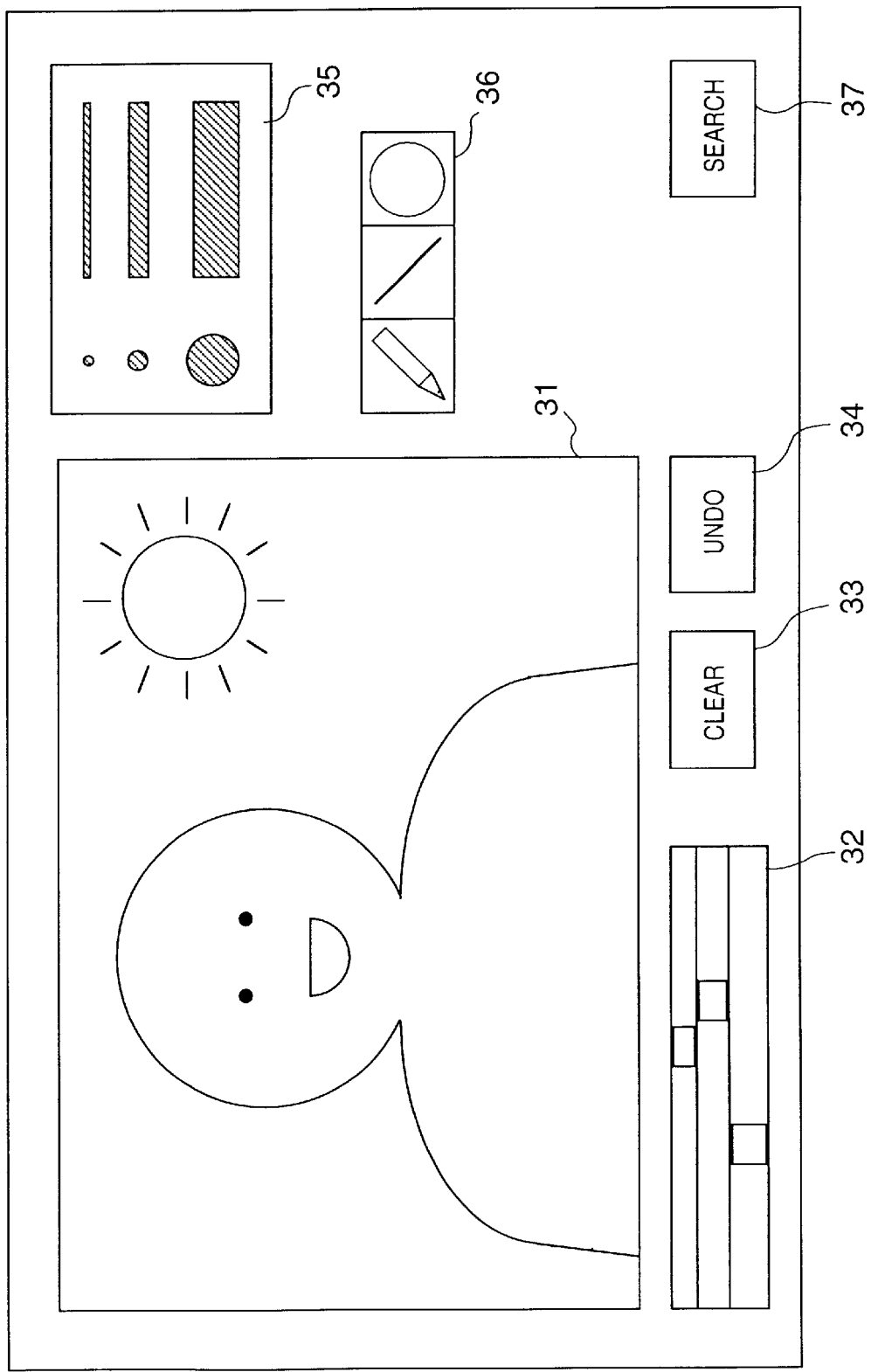
FIG. 3 shows a control window displayed on a display unit 103 in step S21 in the first embodiment.

FIG. 3 shows the control window display on the display unit 103 in step S21 in the first embodiment of the present invention.

Reference numeral 31 denotes a user drawing area; 32, color selection scroll bars; 33, a clear button; 34, an undo button; 35, line width selection radio buttons; 36, tool pallet buttons; and 37, a search execution button. The user can draw an illustration, which is similar to the image wanted and used as a query criteria, on the user drawing area 31 using the drawing tools implemented by software. The software process upon drawing an illustration will be briefly described below.

The color selection scroll bars 32 are used for selecting a pen color used in drawing, and designate R, G, and B values in turn from the uppermost one. Upon pressing the clear button 33, the entire user drawing area 31 is painted in white. Upon pressing the undo button 34, the previous operation is canceled to recover the previous state. The line width selection radio buttons 35 are used for designating the line width of a pen upon drawing. Upon selecting a left "pen" icon on the tool pallet buttons 36, the user can draw a free curve on the drawing area 31 using the pointing device 102a. Upon selecting a central "straight line" icon, the user can draw a straight line by designating its start and end points using the pointing device 102a. Upon selecting a left "circle" icon, the user can draw a circle by designating its center and radius.

After the user has drawn the illustration on the user drawing area 31 using the drawing tools, when he or she presses the search execution button 37, step S21 ends, and the flow advances to step S22.

<Description of Step S22>

In step S22, the image feature amount of the illustration drawn in step S21 is computed.

Figure 4:
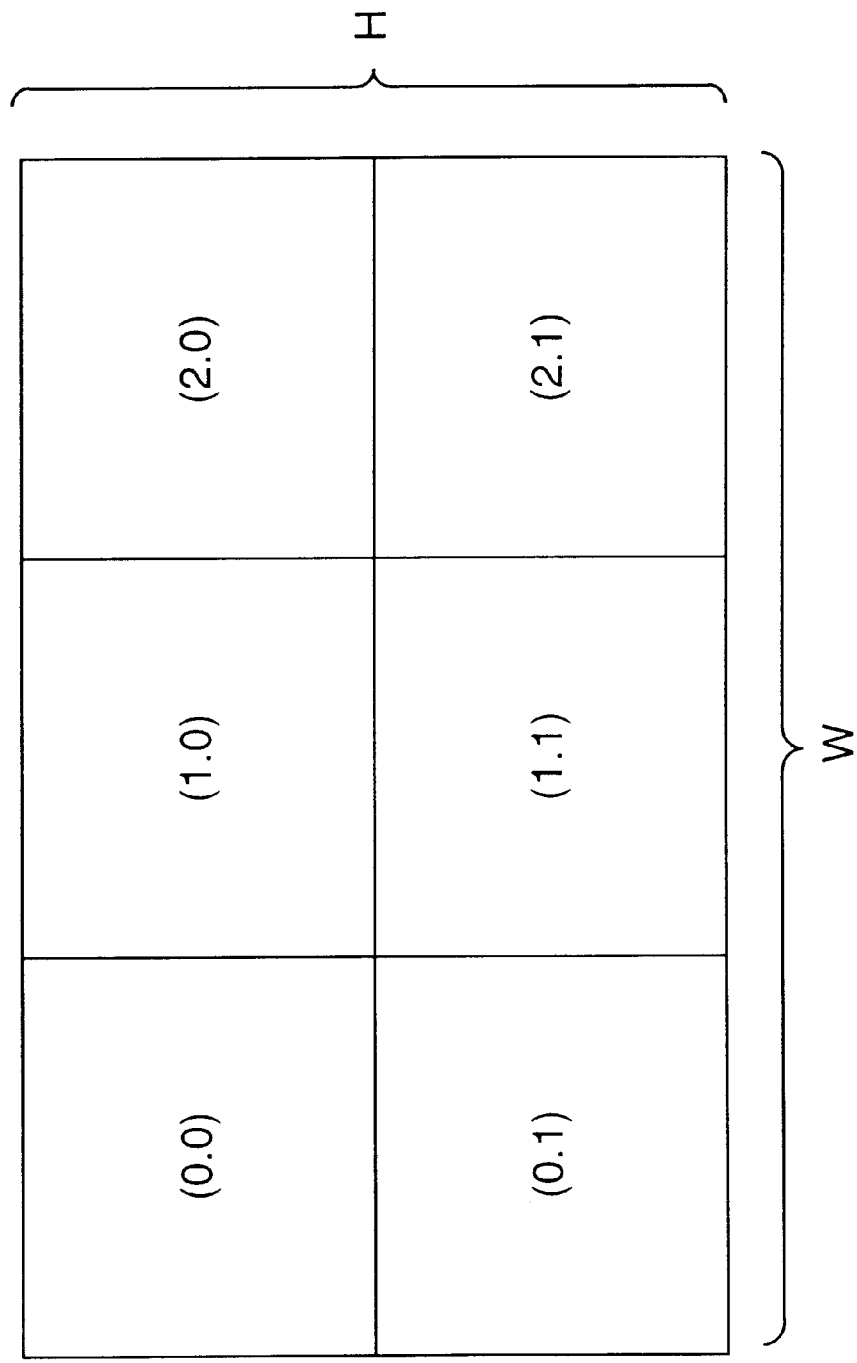
FIG. 4 is a view for explaining image segmentation for extracting an image feature amount in the first embodiment.

As shown in FIG. 4, the size of the user drawing area 31 in this embodiment is defined by W pixels (horizontal)×H pixels (vertical). This area is segmented into a total of six sub-areas, i.e., 3 (horizontal)×2 (vertical) sub-areas (0, 0), (1, 0), . . . , (2, 1) in turn from the upper left sub-area. The R, G, and B average values of these sub-areas are computed, and a total of 18 numerical values are used as the image feature amount of the drawn illustration.

The computation process of the image feature amount will be described below with reference to FIG. 5.

Figure 5:
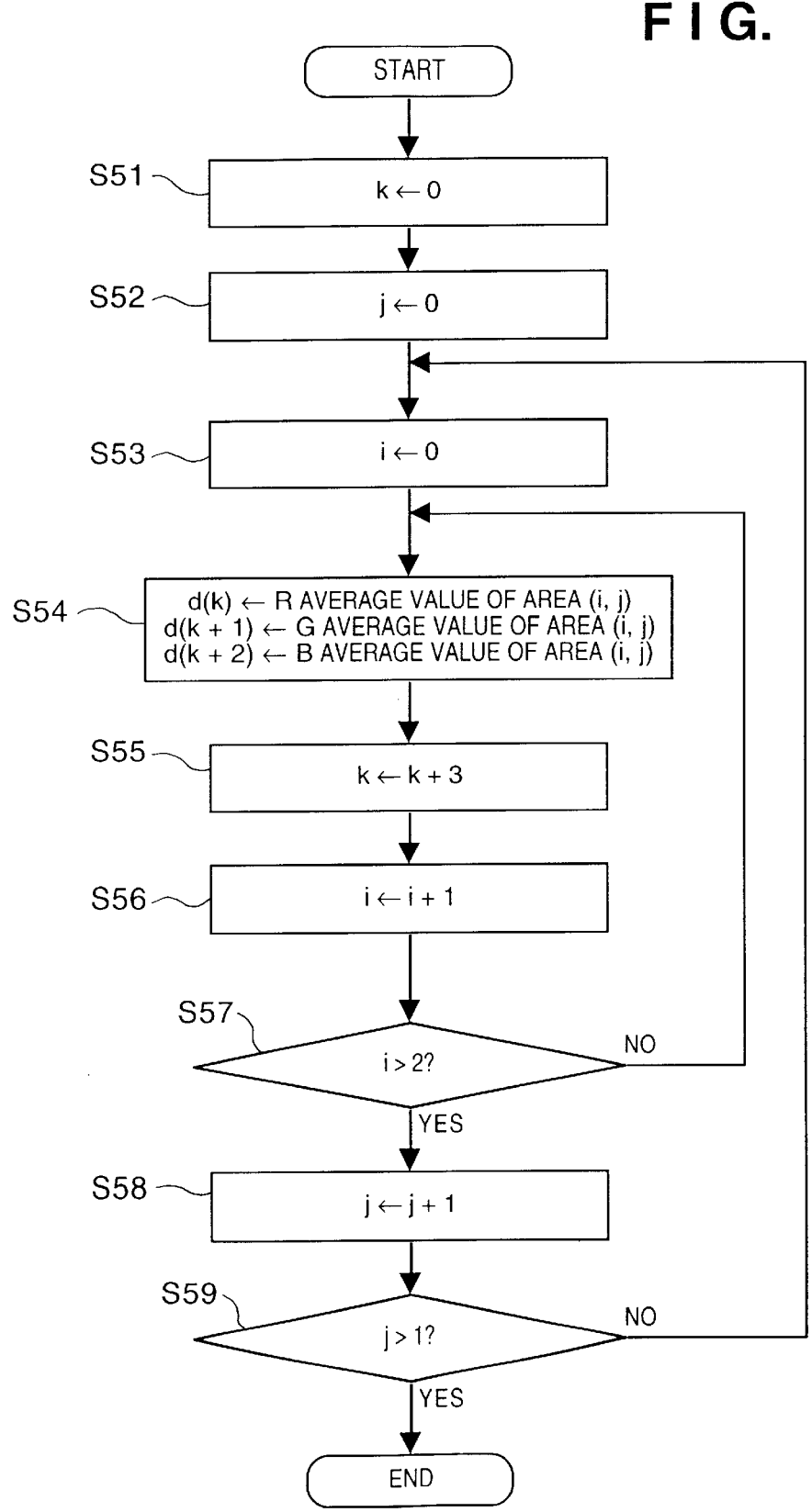
FIG. 5 is a flow chart showing the computation process of the image feature amount in the first embodiment.

FIG. 5 is a flow chart showing the computation process of the image feature amount in the first embodiment.

In step S51, a variable k is initialized to zero. In step S52, a variable j is initialized to zero. In step S53, a variable i is initialized to zero. In step S54, the R average value of a sub-area (i, j) is substituted in the k-th element d(k) of a matrix d. Also, the G and B average values are respectively substituted in d(k+1) and d(k+2). Note that the method of computing the R, G, and B average values will be described in detail later with the aid of the flow chart in FIG. 6.

In step S55, k is incremented by "3". In step S56, i is incremented by "1". In step S57, i is compared with "2". If i>2 (YES in step S57), the flow advances to step S58. On the other hand, if i≦2 (NO in step S57), the flow returns to step S54.

In step S58, j is incremented by "1". In step S59, j is compared with "1". If j>1 (YES in step S59), the process ends. On the other hand, if j≦1 (NO in step S59), the flow returns to step S53.

Upon completion of the process, the computed values of the image feature amount of the drawn illustration are stored in the matrix d( ) having 18 elements. Note that the drawn illustration (image) is segmented into six rectangular areas having equal areas to compute image feature amount values in this embodiment. However, the shape of the segmented area is not limited to a rectangle but may be other complicated shapes, and the number of segmented areas may be increased/decreased. When the number of segmented areas is increased/decreased, the number of elements of the image feature amount is not 18 but increases/decreases accordingly.

The method of computing the R, G, and B average values in step S54 in FIG. 5 will be described in detail below using FIG. 6.

Figure 6:
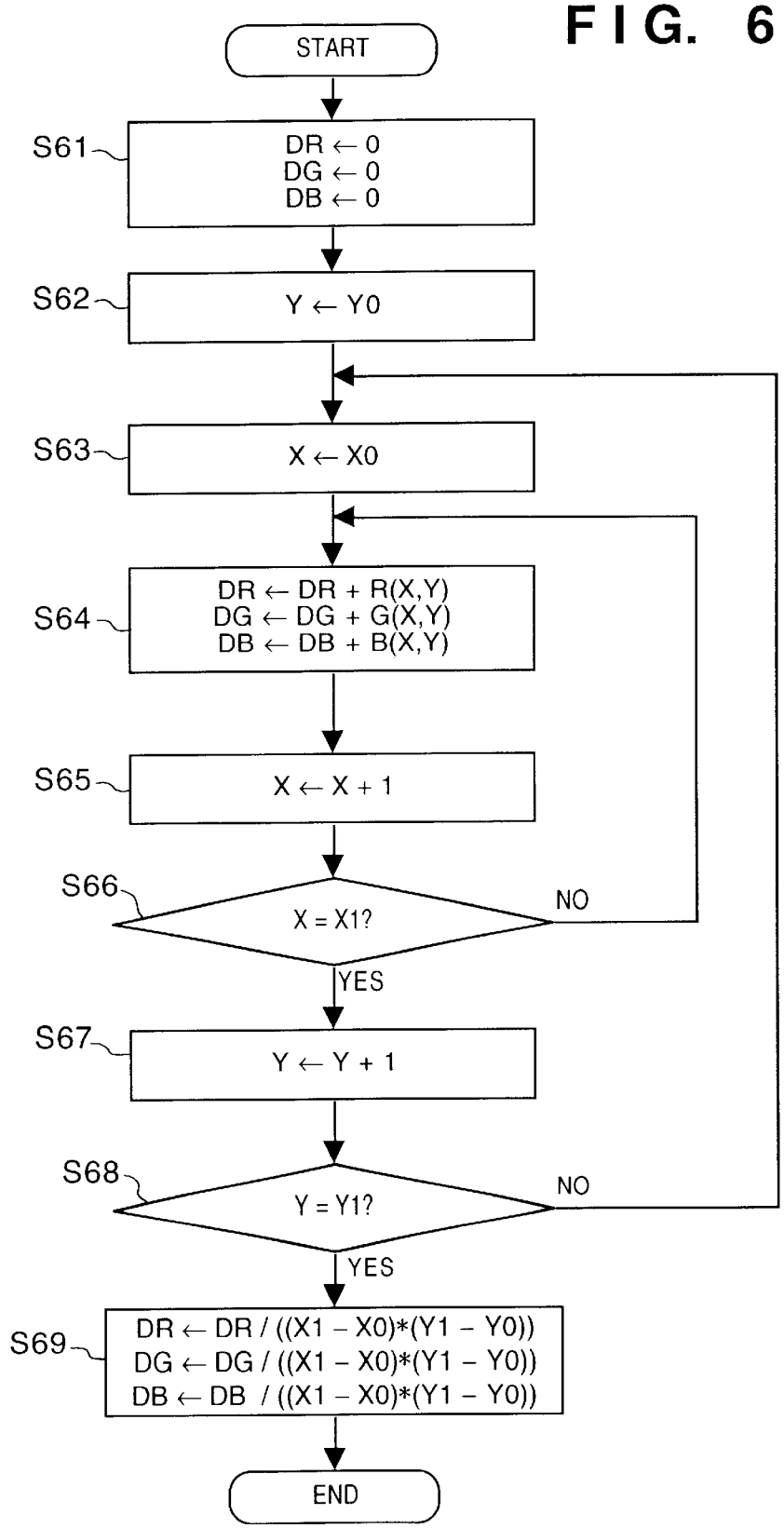
FIG. 6 is a flow chart showing the details of the method of computing the R, G, and B average values in the first embodiment.

FIG. 6 is a flow chart showing the details of the method of computing the R, G, and B average values in the first embodiment.

Assume that image data of the drawn illustration is stored in three matrices R(X, Y), G(X, Y), and B(X, Y). Note that $0 \leq X < W$ and $0 \leq Y < H$, and the start point (0, 0) is set at the upper left corner of the image. In the following flow, the R, G, and B average values of an area within the range of $X0 \leq X < X1$ and $Y0 \leq Y < Y1$ are calculated, and are respectively returned to variables DR, DG, and DB. Furthermore, since an area corresponding to the sub-area (i, j) in step S22 corresponds to:

$$X0 = W*i/3 \quad X1 = W*(i+1)/3$$

$$Y0 = H*j/2 \quad Y1 = H*(j+1)/2$$

the flow chart is executed after constants X0, X1, Y0, and Y1 are initialized, as described above.

In step S61, the variables DR, DG, and DB are initialized to zero. In step S62, a variable Y is initialized to Y0. In step S63, a variable X is initialized to X0. In step S64, R(X, Y) is added to the variable DR. Similarly, G(X, Y) and B(X, Y) are respectively added to the variables DG and DB.

In step S65, the variable X is incremented by "1". In step S66, the variable X is compared with X1. If X =X1 (YES in step S66), the flow advances to step S67. On the other hand, if X≠X1 (NO in step S66), the flow returns to step S64.

In step S67, the variable Y is incremented by "1". In step S68, the variable Y is compared with Y1. If Y=Y1 (YES in step S68), the flow advances to step S68. On the other hand, if Y≠Y1 (NO in step S68), the flow returns to step S67.

In step S69, the variables DR, DG, and DB are respectively divided by (X1−X0)*(Y1−Y0). This divisor indicates the number of pixels in the area. That is, the variables DR, DG, and DB indicate the average densities obtained by dividing the sum totals of pixel densities in the area by the number of pixels.

<Description of Step S23>

In step S23, a similar image search is made based on the image feature amount computed in step S22.

The hard disk device 106 stores N image data, and their image feature amounts are computed by the aforementioned process in advance and stored. Image data may be stored in a standard file format such as JPEG, FlashPix, or the like, which is known to those skilled in the art, or may be stored in a file format unique to a so-called RDBMS (relational database management system). Assume that the image feature amounts are stored in a two-dimensional matrix D(n, i) having a size N*18 (for $0 \leq n < N$, $0 \leq i \leq 18$).

At this time, an image distance S(n) between the drawn illustration (image data) and n-th image data stored in the hard disk device 106 is defined by:

$$S(n) = \sum_i (D(n, i) - d(i))^2$$

As this image distance S(n) is smaller, it is determined that image data has higher similarity.

Initially, the image distances S(n) (for $0 \leq n < N$) between all the N image data stored in the hard disk device 106 and the drawn illustration (image data) are computed. Next, a similar image search is made by selecting M (0<M<N) image data in ascending order of image distance S(n). The computation process of the image distance S(n), and the similar image search process for selecting M image data will be respectively described below using FIGS. 7 and 8.

Figure 7:
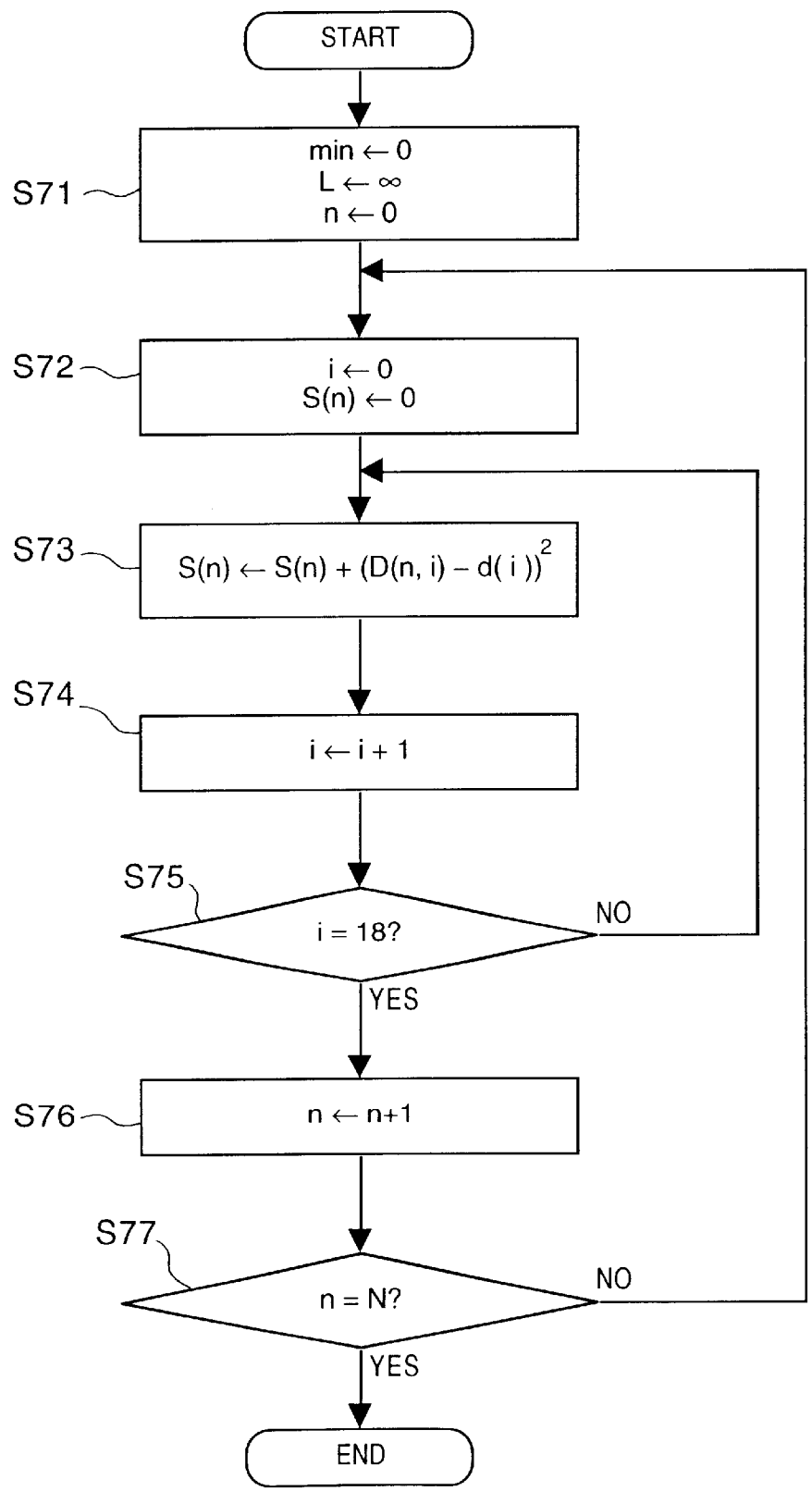
FIG. 7 is a flow chart showing the computation process of an image distance S(n) in the first embodiment.

FIG. 7 is a flow chart showing the computation process of the image distance S(n) in the first embodiment.

In step S71, variables min and n are initialized to zero, and a variable L is initialized to a sufficiently large value. In step S72, variables i and S(n) are initialized to zero. In step S73, a square of the difference between D(n, i) and d(i) is added to S(n). In step S74, the variable i is incremented by "1".

In step S75, the variable i is compared with 18. If i=18 (YES in step S75), the flow advances to step S76. On the other hand, if i≠18 (NO in step S75), the flow returns to step S73.

In step S76, the variable n is incremented by "1". In step S77, the variable n is compared with N. If n=N (YES in step S77), the processing ends. On the other hand, if n≠N (NO in step S77), the flow returns to step S72.

Upon completion of the process, the image distances S(n) between the drawn illustration (image data) and all the image data stored in the hard disk device 106 are stored in a matrix S(n). A similar image search process for selecting M image data in ascending order of image distance S(n) and storing numbers corresponding to the selected image order in a matrix T( ) will be described in detail below using FIG. 8.

Figure 8:
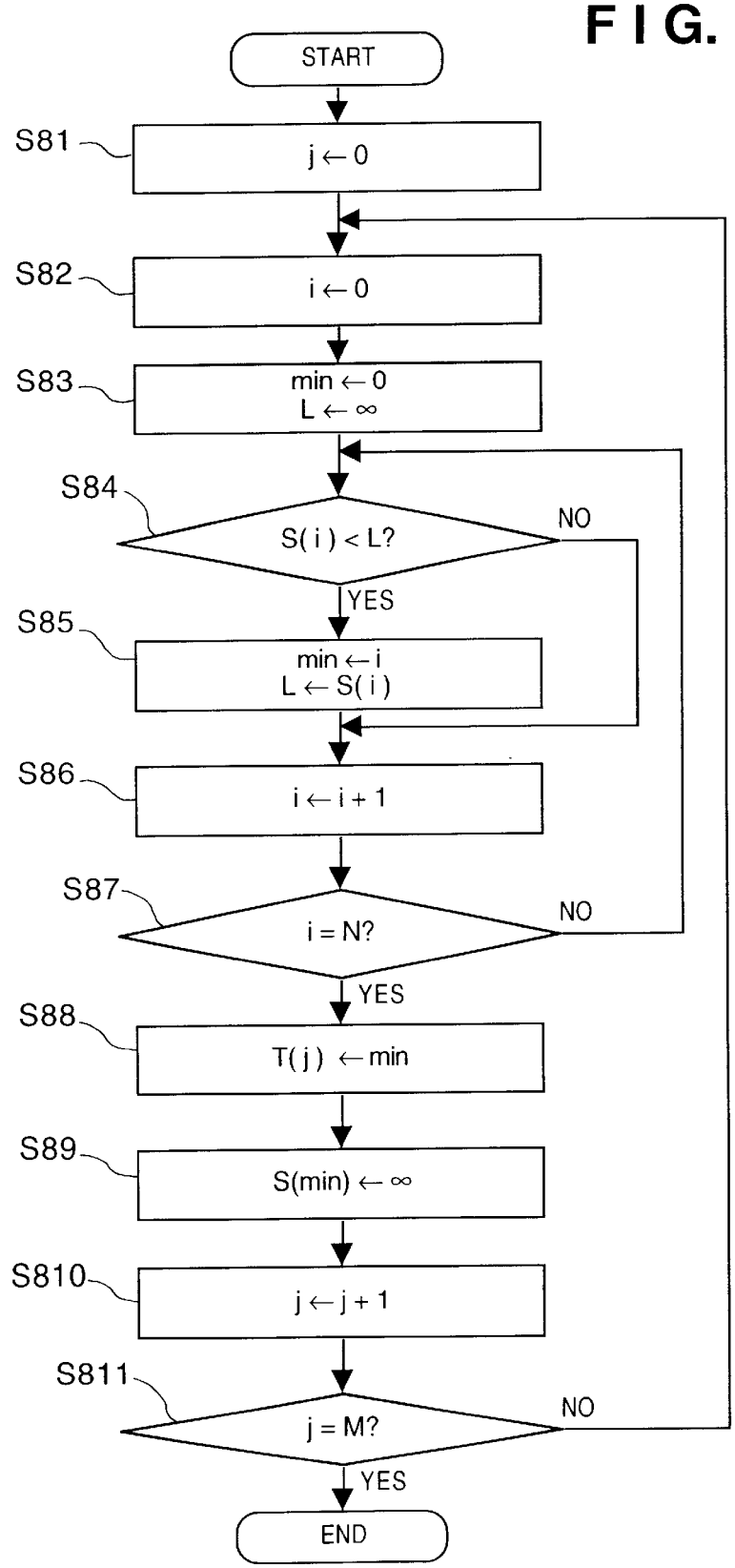
FIG. 8 is a flow chart showing the details of the similar image search process in the first embodiment.

FIG. 8 is a flow chart showing the details of the similar image search process in the first embodiment.

In step S81, a variable j is initialized to zero. In step S82, a variable i is initialized to zero. In step S83, a variable min is initialized to zero and a variable L is initialized to a sufficiently large value. In step S84, S(i) is compared with L. If S(i)<L (YES in step S84), the flow advances to step S85. On the other hand, if S(i)≧L (NO in step S84), the flow advances to step S86.

In step S85, the value i is substituted in the variable min, and S(i) is substituted in L. In step S86, the variable i is incremented by "1". In step S87, i is compared with N. If i=N (YES in step S87), the flow advances to step S88. On the other hand, if i≠N (NO in step S87), the flow returns to step S84.

In step S88, the value min is substituted in T(j). In step S89, a sufficiently large value is substituted in S(min). In step S810, the variable j is incremented by "1". In step S811, the variable j is compared with M. If j=M (YES in step S811), the processing ends. On the other hand, if j≠M (NO in step S811), the flow returns to step S82.

Upon completion of the process, the image numbers of image data stored in the hard disk device 106 are stored in the matrix T(j) (for 0≦j<M) in descending order of similarity with the drawn illustration (image data).

<Description of Step S24>

Figure 9:
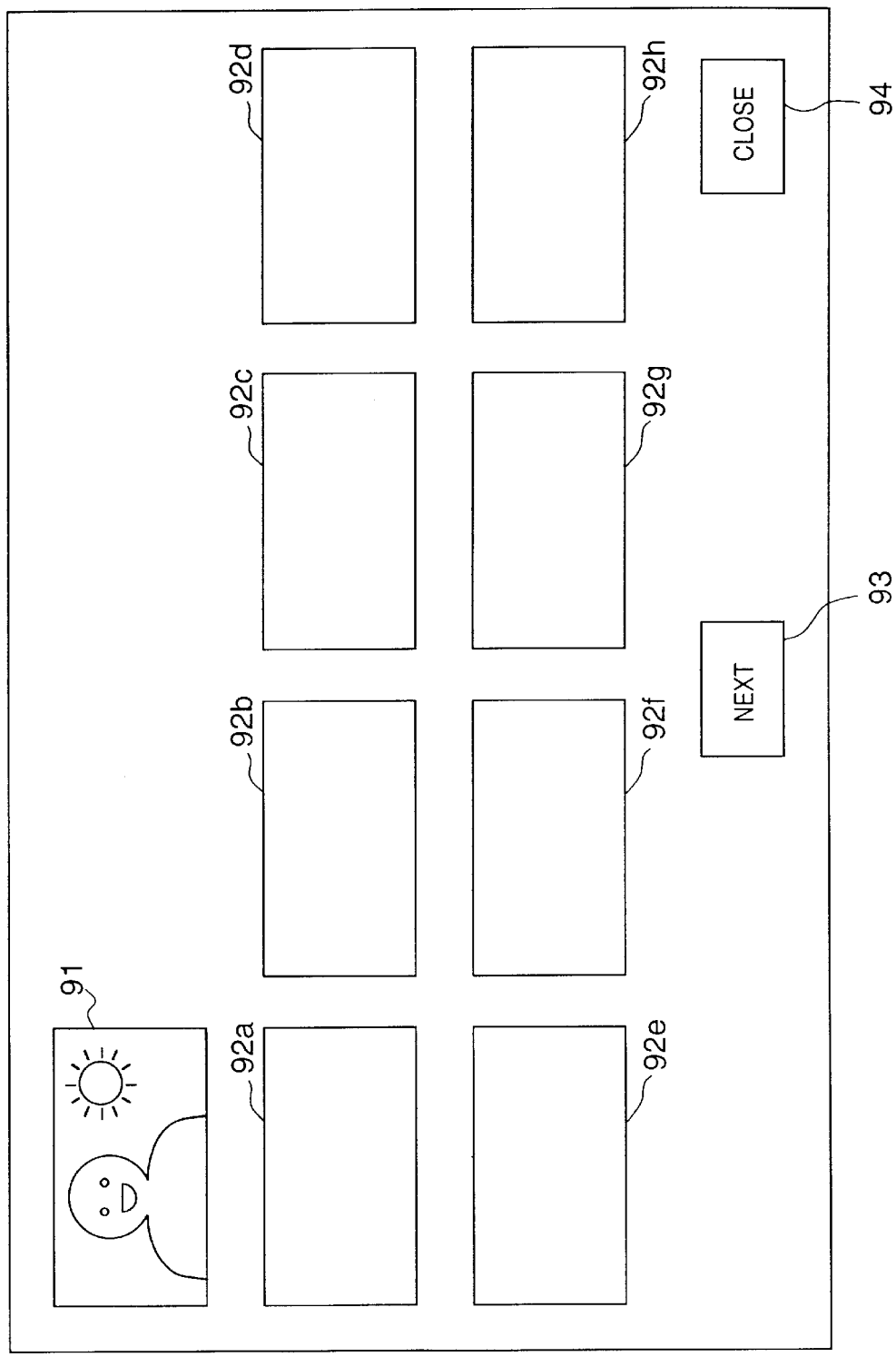
FIG. 9 shows a control window displayed on the display unit 103 in step S24 in the first embodiment.

FIG. 9 shows the control window displayed on the display unit 103 in step S24 in the first embodiment.

An area 91 displays a reduced-scale image of the drawn illustration. Areas 92a to 92h display reduced-scale images of similar images retrieved by the above processes. The area 92a displays an image corresponding to T(0) with highest similarity, the area 92b displays an image corresponding to T(1), . . . , and the area 92h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Upon pressing a button 93, next candidates, i.e., reduced-scale images of image data corresponding to T(8) to T(15), are displayed on the areas 92a to 92h. This operation can be repeated until T(M−1) is reached. Upon pressing a button 94, the process in step S24 ends.

As described above, according to the first embodiment, since an image drawn by the user can be used as a query criteria upon searching for desired image data, an image search that quickly reflects user's will can be made.

Second Embodiment

In the first embodiment, a similar image search is made based on the illustration drawn by the user. By contrast, in the second embodiment, desired image data can be efficiently found by a search by correcting the illustration drawn by the user with reference to the search results.

Figure 10:
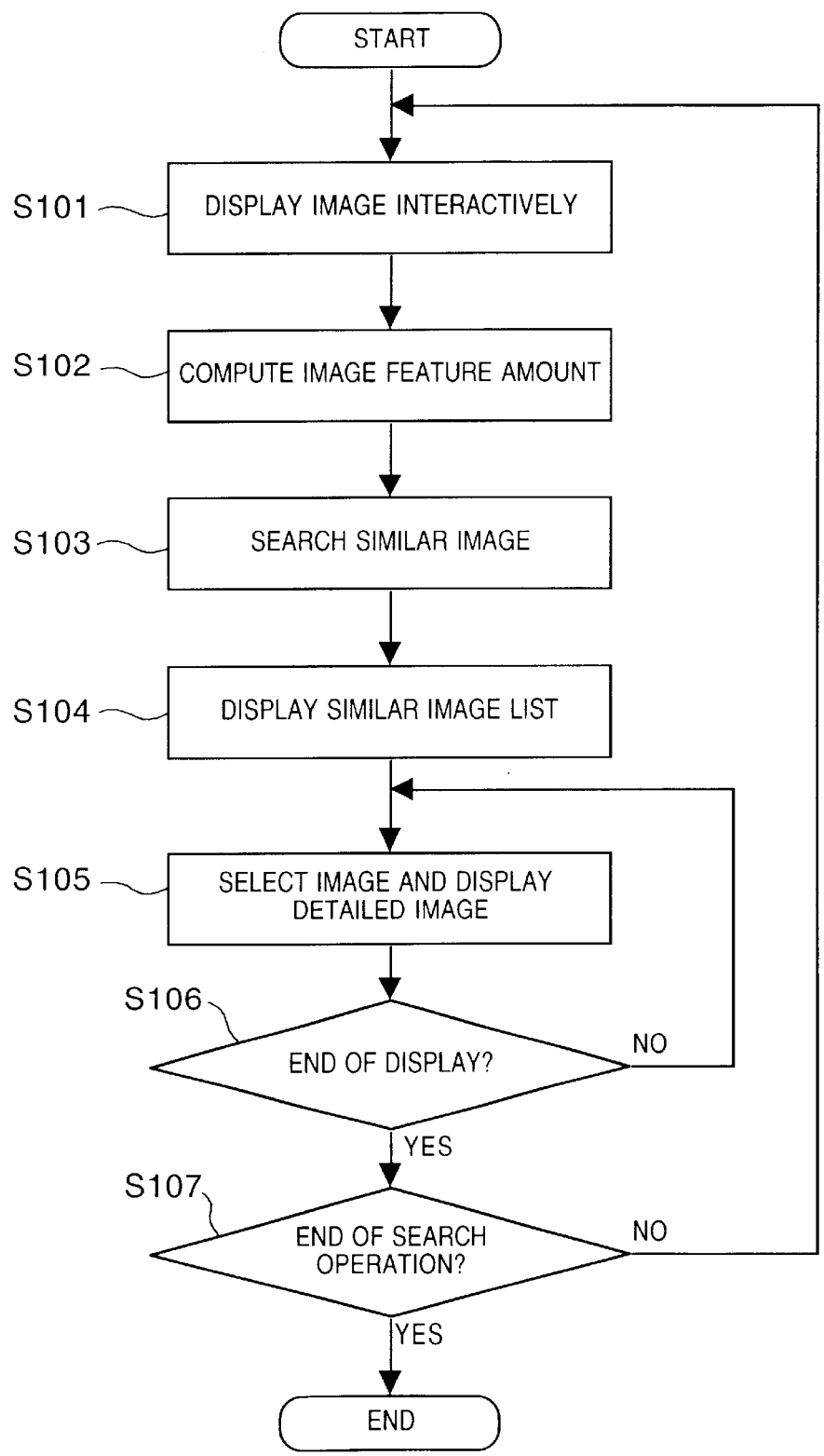
FIG. 10 is a flow chart showing an outline of the processes executed in the second embodiment.

FIG. 10 is a flow chart showing an outline of the processes executed in the second embodiment.

In step S101, the user draws an illustration, which is similar to the image data wanted and stored on the hard disk device 106, and is used as a query criteria, on the display unit 103. In step S102, the image feature amount of the drawn illustration is computed. In step S103, a similar image search is made based on the computed image feature amount. In step S104, similar images found by the search are displayed on the display unit 103.

In step S105, a detailed image of one of the similar images displayed in step S104 is displayed. It is checked in step S106 if the detailed display process is to end. If the detailed display process is not to end (NO in step S106), the flow returns to step S105. On the other hand, if the process is to end (YES in step S106), the flow advances to step S107 to check if search operation is to end. If search operation is not to end (NO in step S107), the flow returns to step S101. On the other hand, if search operation is to end (YES in step S107), the process ends.

The processes executed in the individual steps will be explained in detail below.

The processes executed in steps S101 to S103 correspond to steps S21 to S23 in the first embodiment described above, and their details are as have been described in the first embodiment.

The arrangement of the control window displayed on the display unit 103 in step S104 is as shown in FIG. 9, and has the same functions as in the first embodiment. However, in this embodiment, one of reduced-scale images displayed on the areas 92a to 92h can be "selected" using the pointing device 102a.

In step S105, a detailed image of the reduced-scale image selected in step S104 is displayed. The arrangement of the display window at that time will be explained below with reference to FIG. 11.

Figure 11:
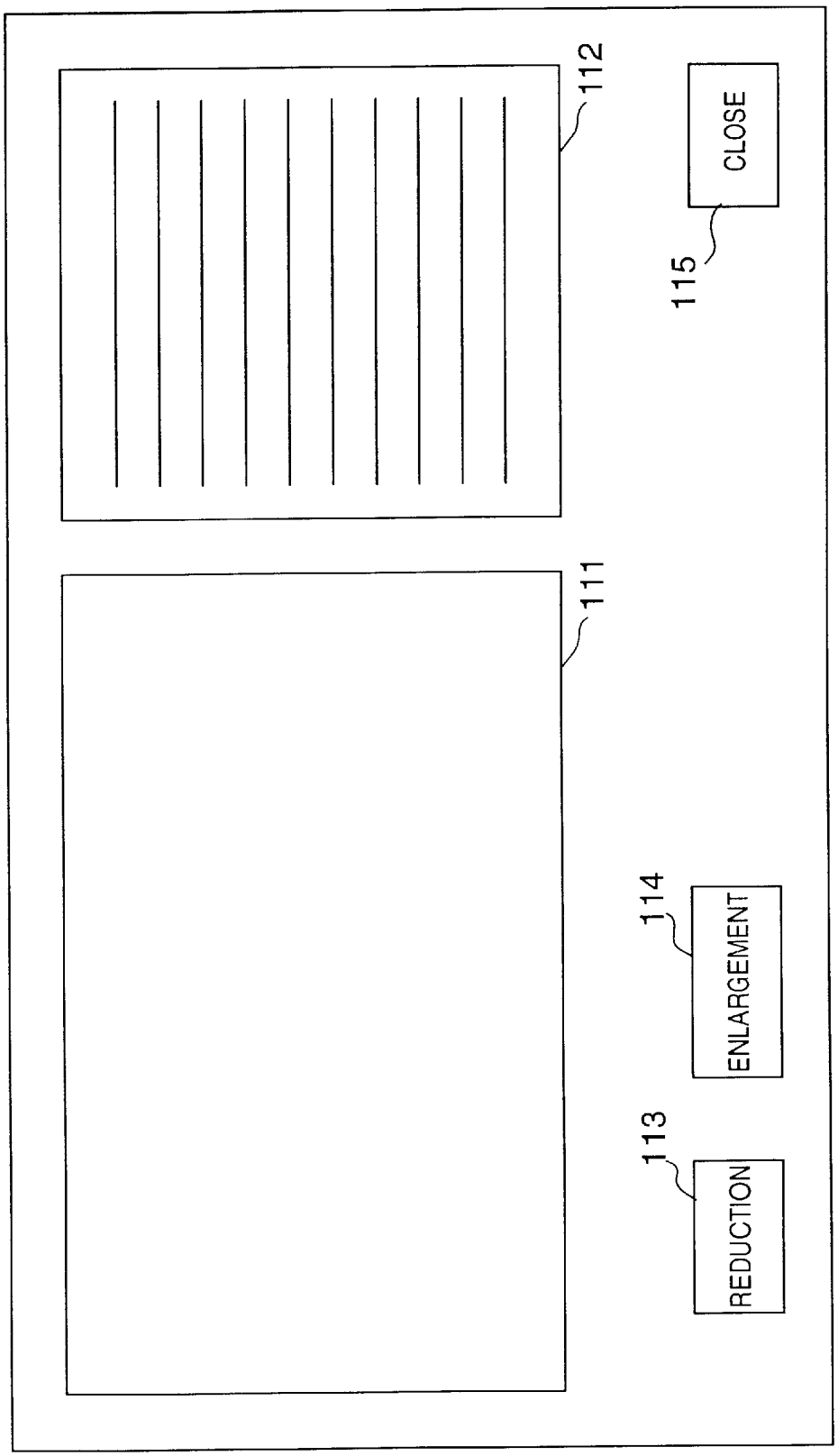
FIG. 11 shows a control window displayed on a display unit 103 in step S105 in the second embodiment.

FIG. 11 shows the control window displayed on the display unit 103 in step S105 in the second embodiment.

Reference numeral 111 denotes an image display area, which displays a detailed image of the selected reduced-scale image. Upon operating a reduction button 113 or enlargement button 114, an image can be confirmed by partially enlarging or reducing the image. Reference numeral 112 denotes a character display area for displaying character information stored in association with the image. For example, the area 112 displays the photographing date, copyright information, and the like. Upon pressing a button 115, the display of the detailed image is ended, and the flow advances to step S106.

In step S106, the control window shown in FIG. 9 is displayed again. If a detailed image of another reduced-scale image is to be seen, the user repeats the above operations, i.e., selects a reduced-scale image as needed to display its detailed image. If there is no reduced-scale image, a detailed image of which is to be seen, the user presses the button 94, and the flow advances to step S107.

The user determined in step S107 if search operation is to end. If search operation is to end, the process ends. On the other hand, if search operation is not to end, the flow returns to step S101. In this case, the screen returns to the window arrangement shown in FIG. 3. The user drawing area 31 displays the illustration, which is being input, so that the user can continue to draw the illustration that he or she has drawn so far. With this arrangement, an image search can be repeated while gradually correcting an illustration, which is used as a query criteria, in accordance with the search result. As a result, even when a desired image cannot be found by search based on the initially drawn illustration, the user repeats operation for correcting the illustration to gradually obtain a better result, and making a search, thus finally obtaining a desired image by search.

Upon pressing the button 33, the drawn illustration is cleared. Hence, the user can clear the user drawing area 31 anytime, and can draw an illustration from the beginning.

As described above, according to the second embodiment, since an image input as a query criteria for searching for desired image data can be appropriately corrected, an image search that reflects user's will more quickly can be made in addition to the effects obtained by the first embodiment.

Third Embodiment

In step S21 or S101 described above, the window layout shown in FIG. 3 is presented as an example of general image drawing software, but the window may have more functions (or fewer functions) than that shown in FIG. 3. Also, an image drawn by another software may be loaded using a so-called inter-application communication technique.

In step S24 or S104, reduced-scale images corresponding to image data as the processing result of a similar image search process are displayed in a two-dimensional matrix. However, the reduced-scale images may be lined up in a horizontal array or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

Steps S21 and S24 or steps S101 and S104 may be combined, and the illustration to be drawn and the processing results of the similar image search process may be simultaneously displayed. In particular, if this arrangement is applied to the second embodiment, the illustration can be corrected with reference to the search result on a single window, thus further improving the processing efficiency.

Fourth Embodiment

Since the arrangement of an image search apparatus of the fourth embodiment is the same as that of the image search apparatus shown in FIG. 1 of the first embodiment, a detailed description thereof will be omitted.

The control window to be displayed on the display unit 103 upon executing a search process in the fourth embodiment will be explained below with reference to FIG. 12.

Figure 12:
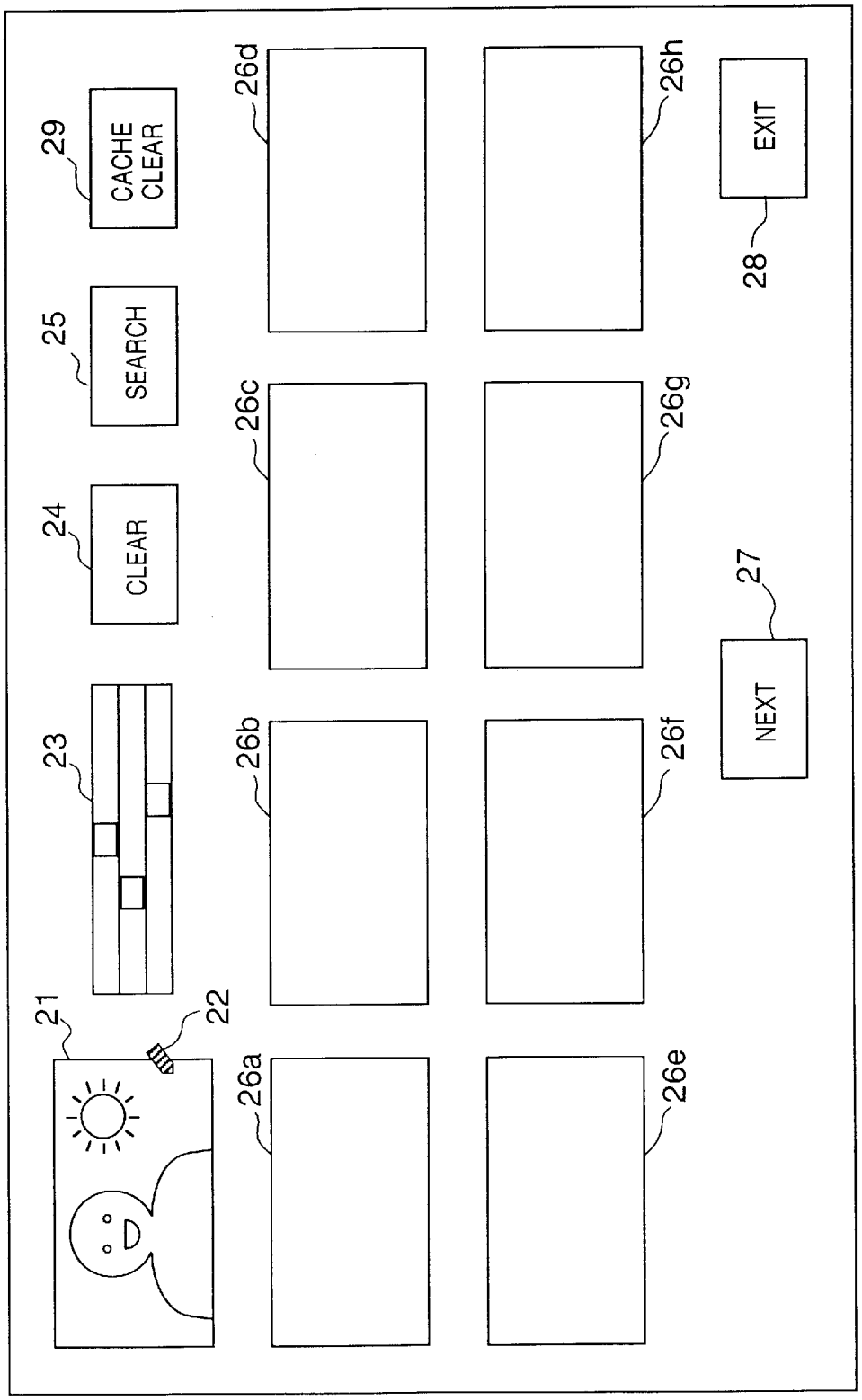
FIG. 12 shows a control window displayed on a display unit upon executing a search process of the fourth embodiment.

FIG. 12 shows the control window displayed on the display unit upon executing a search process in the fourth embodiment.

Reference numeral 21 denotes a user drawing area; 22, a cursor; 23, color selection scroll bars; 24, a clear button; 25, a search execution button; 27, a next candidate display button; 28, a processing end button; and 29, a cache clear button. Also, reference numerals 26a to 26h denote areas for displaying icon images corresponding to image data as search results.

The user can draw an illustration, which is similar to the image wanted and used as a query criteria, on the user drawing area 21 using the drawing tools implemented by software. The software process upon drawing an illustration will be briefly described below.

The color selection scroll bars 23 are used for selecting a pen color used in drawing, and designate R, G, and B values in turn from the uppermost one. Upon pressing the clear button 24, the entire user drawing area 21 is painted in white. The user moves the cursor 22 using the pointing device 102a and can draw a free curve on the user drawing area 21. Upon pressing the processing end button 28, the control window is closed, and the processing ends. Upon pressing the cache clear button 29, icon images cached on the RAM 105 or the like as cache data are cleared.

An outline of the processes executed by the image search apparatus of the fourth embodiment will be described below with reference to FIG. 13.

Figure 13:
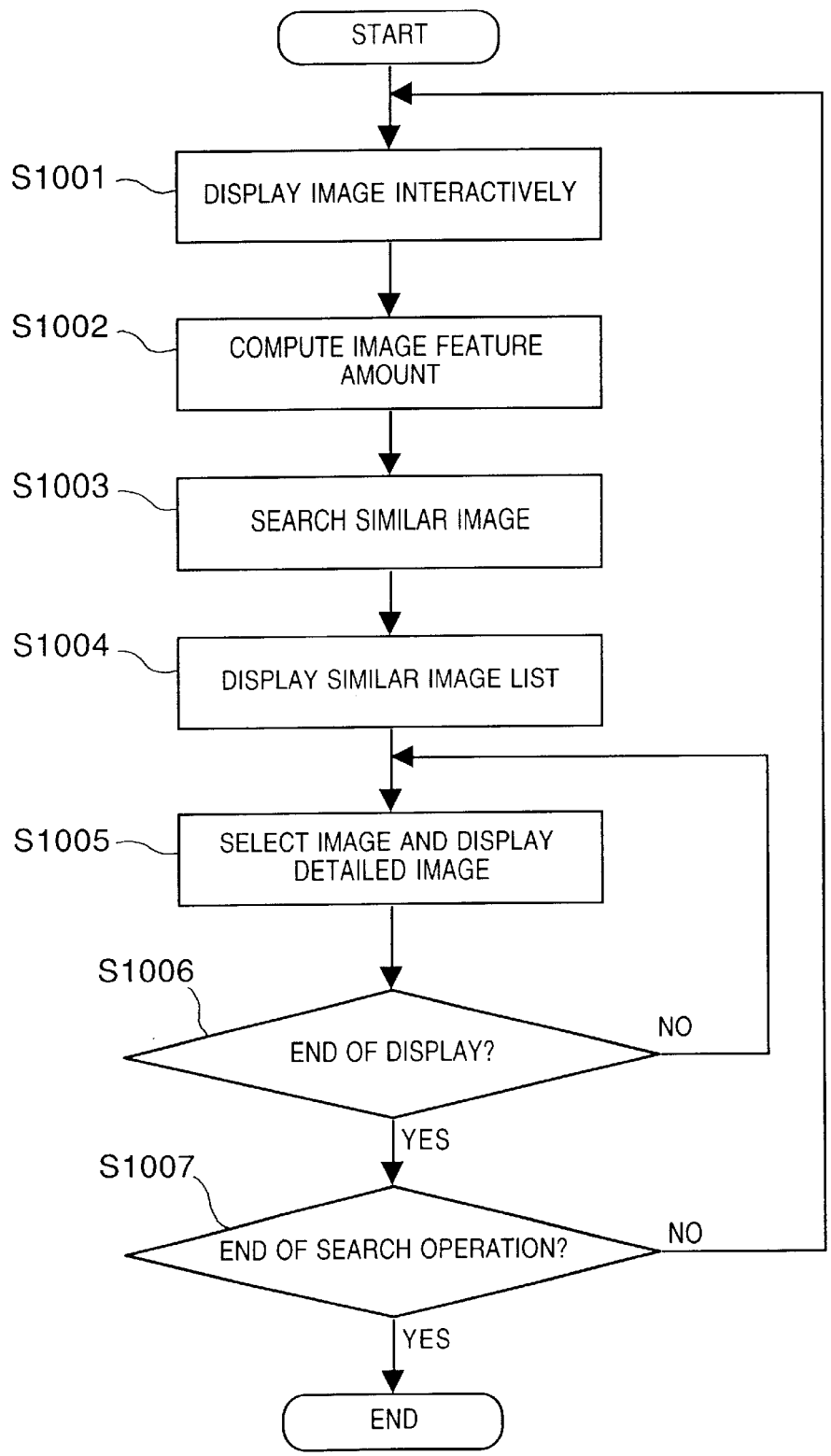
FIG. 13 is a flow chart showing an outline of the processes executed by an image search apparatus of the fourth embodiment.

FIG. 13 is a flow chart showing an outline of the processes executed by the image search apparatus of the fourth embodiment.

In step S1001, the user draws an illustration, which is similar to the image data wanted and stored on the hard disk device 106, and is used as a query criteria, on the display unit 103. In step S1002, the image feature amount of the drawn illustration is computed. In step S1003, a similar image search is made based on the computed image feature amount. In step S1004, similar images found by the search are displayed on the display unit 103.

In step S1005, a detailed image of one of the similar images displayed in step S1004 is displayed. It is checked in step S1006 if the detailed display process is to end. If the detailed display process is not to end (NO in step S1006), the flow returns to step S1005. On the other hand, if the process is to end (YES in step S1006), the flow advances to step S1007 to check if search operation is to end. If search operation is not to end (NO in step S1007), the flow returns to step S1001. On the other hand, if search operation is to end (YES in step S1007), the process ends.

The processes executed in the individual steps will be described in detail below.

<Description of Step S1001>

In step S1001, the user draws an illustration, which is used as query criteria, on the user drawing area 21, and the flow advances to the next step S1002 at an appropriate timing. The process at that time will be explained below with reference to FIG. 14. At that timing, the system monitors the movement of the mouse 102a, and every time the movement is monitored, the image feature amount of an image drawn so far is computed.

Figure 14:
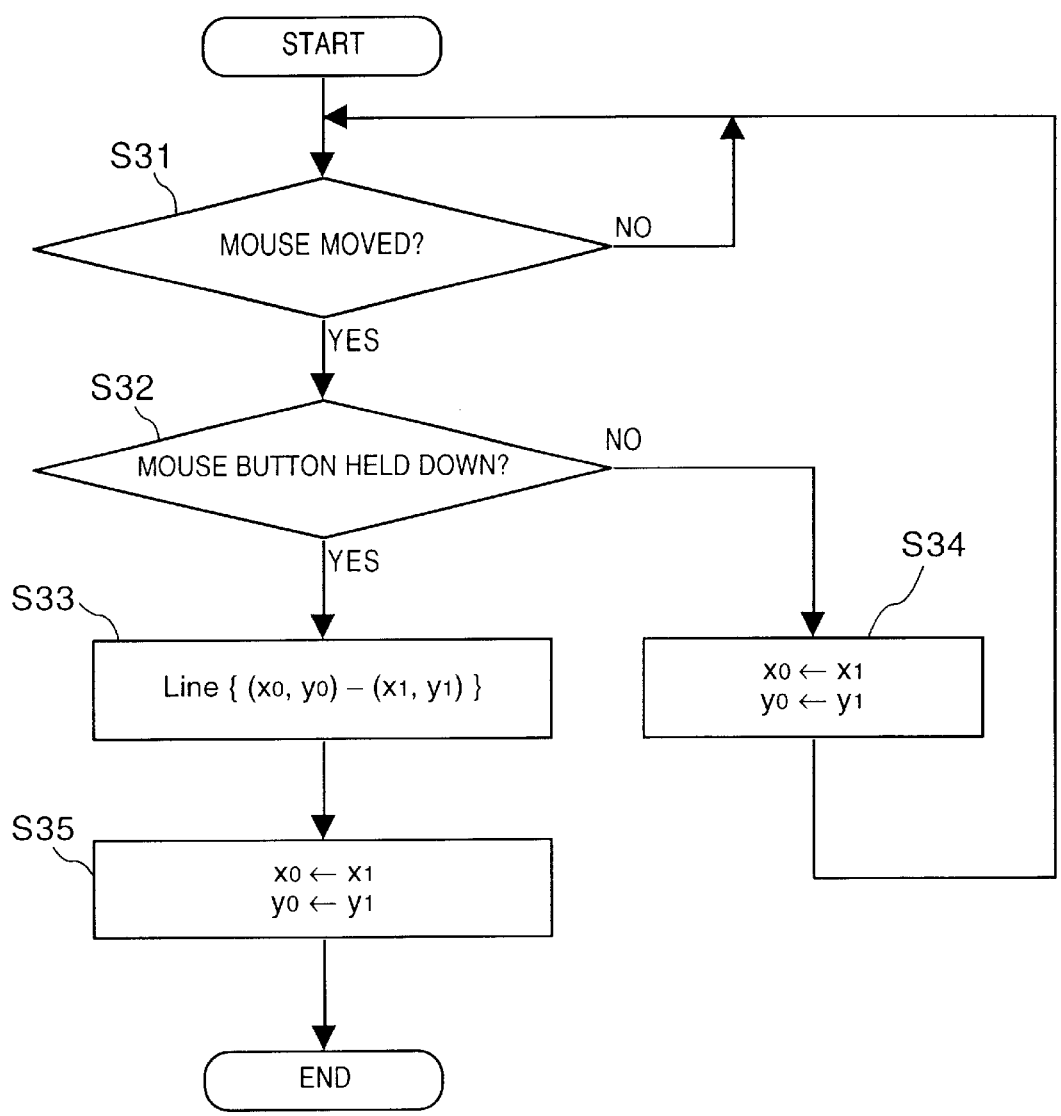
FIG. 14 is a flow chart showing the details of the process executed in step S1001 in the fourth embodiment.

FIG. 14 is a flow chart showing the details of the process executed in step S1001 in the fourth embodiment.

Note that x0 and y0 are variables for storing the previous position of the cursor 22, and x1 and y1 are variables that store the current position of the cursor 22.

It is checked in step S31 if the user has moved the mouse 102a. If the user has not moved the mouse yet (NO in step S31), the flow returns to step S31. That is, the process in this step forms a loop for monitoring the movement of the mouse 102a. On the other hand, if the user has moved the mouse (YES in step S31), the flow advances to step S32.

It is checked in step S32 if the mouse button of the mouse 102a is being held down. If the mouse button is not held down (NO in step S32), the flow advances to step S34 to substitute the current position (x1, y1) of the cursor 22 in (x0, y0), and the flow returns to step S31. In this manner, the cursor 22 alone can be moved without drawing any stroke.

On the other hand, if the mouse button is being held down (YES in step S32), i.e., if the user is dragging the mouse, the flow advances to step S33. In step S33, a line is drawn between the previous position (x0, y0) and the current position (x1, y1) of the cursor 22 in a color determined by the color selection scroll bars 23.

In step S35, the current position (x1, y1) of the cursor 22 is substituted in (x0, y0) to end step S1001, and the flow advances to step S1002.

This process makes the user feel as if a search were automatically executed every time he or she adds a stroke to the illustration.

<Description of Step S1002>

In step S1002, the image feature amount of the illustration drawn in step S1001 is computed. Since the image feature amount, the computation process of the image feature amount, and the method of computing the R, G, and B average values are the same as those shown in FIGS. 4 to 6 in the first embodiment, a detailed description thereof will be omitted.

<Description of Step S1003>

In step S1003, a similar image search is made on the basis of the image feature amount computed in step S1002. Since the similar image search process is the same as that shown in FIGS. 7 and 8 in the first embodiment, a detailed description thereof will be omitted.

<Description of Step S1004>

The processing contents will be explained below with reference to the control window shown in FIG. 12.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Each icon image can be "selected" using the pointing device 102a. Upon pressing the button 27, next candidates, i.e., icon images of image data corresponding to T(8) to T(15), are displayed on the areas 26a to 26h. This operation can be repeated until T(M−1) is reached.

<Description of Steps S1005 to S1007>

In step S1005, a detailed image of the icon image selected in step S1004 is displayed. Since the arrangement of the display window at that time is the same as that shown in FIG. 11 of the first embodiment, a detailed description thereof will be omitted.

In step S1006, the control window shown in FIG. 12 is displayed again. If a detailed image of another icon image is to be seen, the user repeats the above operations, i.e., selects an icon image as needed to display its detailed image. If there is no desired image among the displayed icon images, the user draws an illustration on the user drawing area 21 again, and the flow advances to step S1007. The flow returns to step S1001 again to correct the illustration, and a similar image search is repeated on the basis of the corrected illustration. Upon pressing the processing end button 28 in step S1007, the processing ends.

As described above, according to the fourth embodiment, every time the user draws an illustration (e.g., one stroke) on the user drawing area 21 using the pointing device 102a, icon images corresponding to image data, which are similar to the state of the illustration at that instance, are displayed on the areas 26a to 26h. Since this process is repeated while the user draws the illustration, a similar image search process can be efficiently done by continuously drawing the illustration until a desired image is displayed.

Fifth Embodiment

In the fourth embodiment, a search process is executed every time the user draws a stroke of an illustration, i.e., a similar image search process is executed very frequently. However, the number of times a search is made is often preferably small due to limited system performance or user's convenience. If this is the case, different operation may be implemented by changing the process in step S1001. This process will be described below as the fifth embodiment.

In step S1001, the user draws an illustration, which is used as a query criteria, on the user drawing area 21, and the flow advances to the next step S1002 at an appropriate timing. The process at that time will be explained below with reference to FIG. 15.

Figure 15:
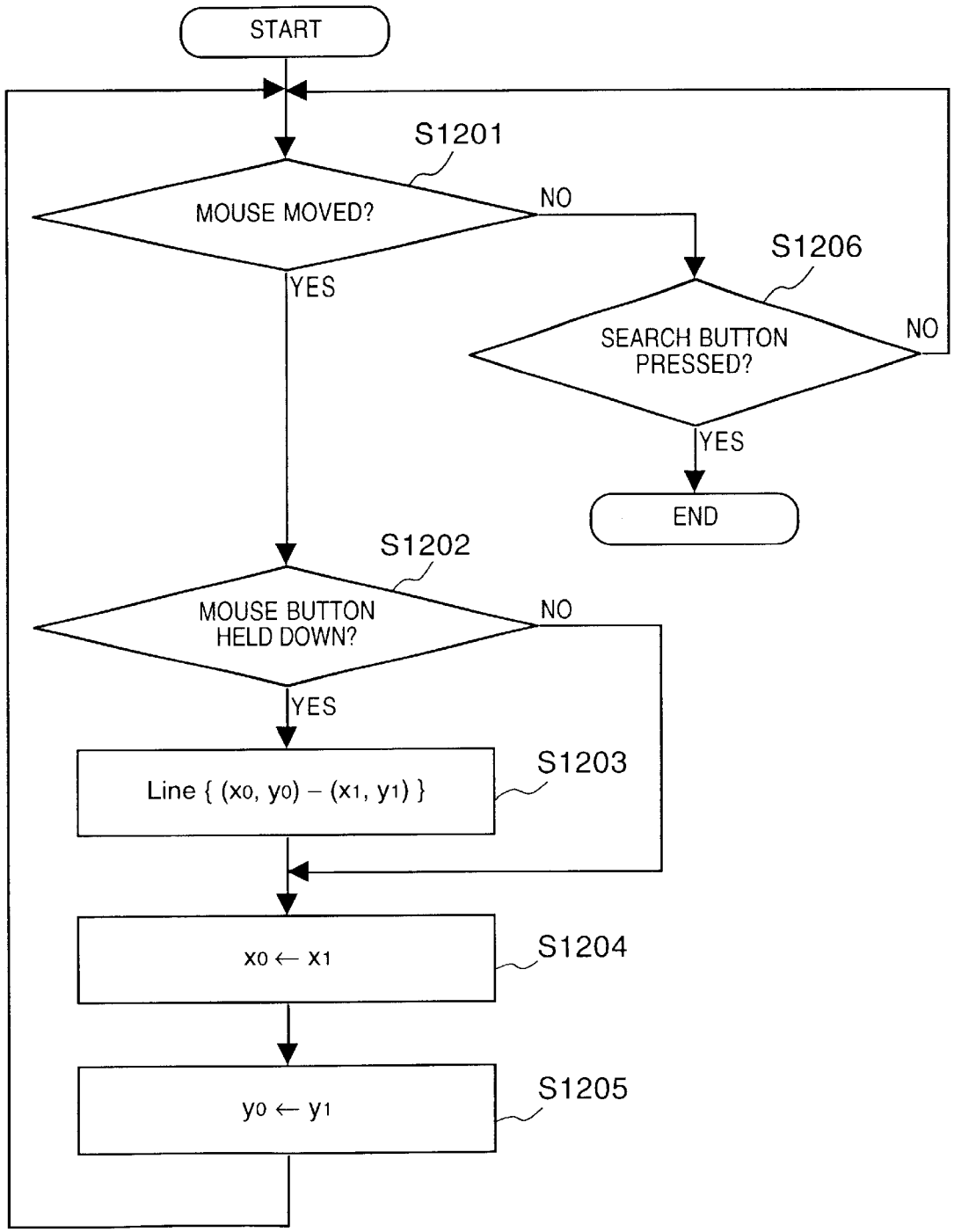
FIG. 15 is a flow chart showing the details of the process executed in step S1001 in the fifth embodiment.

FIG. 15 is a flow chart showing the details of the process executed in step S1001 in the fifth embodiment.

Note that x0 and y0 are variables for storing the previous position of the cursor 22, and x1 and y1 are variables that store the current position of the cursor 22.

It is checked in step S1201 if the user has moved the mouse 102a. If the user has moved the mouse (YES in step S1201), the flow advances to step S1202. On the other hand, if the user has not moved the mouse (NO in step S1201), the flow advances to step S1206 to check if the search execution button 25 has been pressed. If the button 25 has been pressed (YES in step S1206), the process in step S1001 is ended, and the flow advances to step S1002. That is, the search process is started. On the other hand, if the button 25 has not been pressed yet (NO in step S1206), the flow returns to step S1201. That is, a loop for monitoring the movement of the mouse 102a and status of the search execution button 25 is formed.

If it is determined in step S1201 that the mouse has moved (YES in step S1201), the flow advances to step S1202 to check if the mouse button of the mouse 102a is being held down. If the mouse button is not held down (NO in step S1202), the flow advances to step S1204 to substitute the current position (x1, y1) of the cursor 22 in (x0, y0), and the flow returns to step S1201. In this manner, the cursor 22 alone can be moved without drawing.

On the other hand, if the mouse button is being held down (YES in step S1202), i.e., if the user is dragging the mouse, the flow advances to step S1203. In step S1203, a line is drawn between the previous position (x0, y0) and the current position (x1, y1) of the cursor 22 in a color determined by the color selection scroll bars 23.

In step S1205, the current position (x1, y1) of the cursor 22 is substituted in (x0, y0) to end step S1001, and the flow advances to step S1002.

As described above, according to the fifth embodiment, since a similar image search process can be executed in response to depression of the search execution button 25, it can be done at the user's convenience. For example, after the user has drawn an illustration to some extent, he or she can start a similar image search process.

Sixth Embodiment

Another processing example in step S1001 will be explained below as the sixth embodiment.

Figure 16:
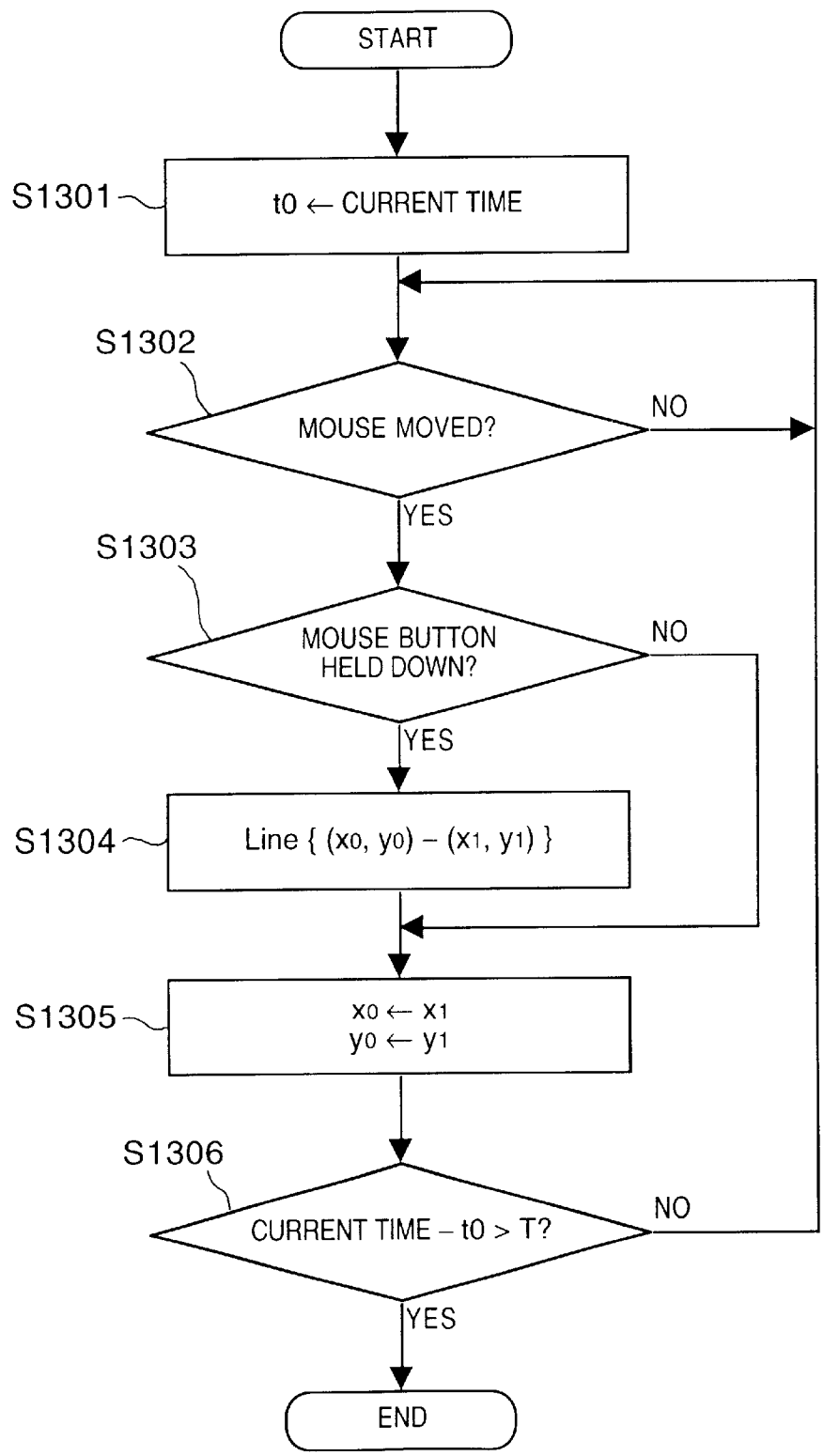
FIG. 16 is a flow chart showing the details of the process executed in step S1001 in the sixth embodiment.

FIG. 16 is a flow chart showing the details of the process executed in step S1001 in the sixth embodiment.

Note that x0 and y0 are variables for storing the previous position of the cursor 22, and x1 and y1 are variables that store the current position of the cursor 22.

In step S1301, the current time is substituted in a variable t0. It is checked in step S1302 if the user has moved the mouse 102a. If the user has not moved the mouse (NO in step S1302), the flow returns to step S1302. That is, this process forms a loop for monitoring the movement of the mouse 102a. If the user has moved the mouse (YES in step S1302), the flow advances to step S1303.

It is then checked in step S1303 if the mouse button of the mouse 102 is being held down. If the mouse button is not held down (NO in step S1303), the flow advances to step S1305 to substitute the current position (x1, y1) of the cursor 22 in (x0, y0). In this manner, the cursor 22 alone can be moved without drawing.

On the other hand, if the mouse button is being held down (YES in step S1303), i.e., if the user is dragging the mouse, the flow advances to step S1304. In step S1304, a line is drawn between the previous position (x0, y0) and the current position (x1, y1) of the cursor 22 in a color determined by the color selection scroll bars 23. In step S1305, the current position (x1, y1) of the cursor 22 is substituted in (x0, y0), and the flow advances to step S1306.

In step S1306, the difference between the current time and variable t0 is calculated, and is compared with a constant T. If the difference is larger than the constant T (YES in step S1306), i.e., if the time T has elapsed from the beginning of step S1001, the process ends, and the flow advances to the next step S1002. On the other hand, if the difference is equal to or smaller than the constant T (NO in step S1306), the flow returns to step S1302.

As described above, according to the sixth embodiment, a similar image search process can be executed at appropriate time intervals while the user is drawing an illustration. If a large constant T is set, a similar image search process can be executed less frequently; otherwise, it can be executed more frequently. The constant T may be set by the user. Or the constant T may be adaptively changed in accordance with the load on the system.

Seventh Embodiment

In addition to the fifth and sixth embodiments described above, various search execution timings can be set by changing the process in step S1001. For example, a search may be made at given time intervals without requiring user operation. On the other hand, when a search is made in response to a change in illustration, which is used as a query criteria, by the user, the number of times of change may be counted, and a search may be made every time the number of times of change exceeds a predetermined value. In this manner, by combining the processes described above, the search execution timing can be set more flexibly.

In step S1004, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

Eighth Embodiment

Since the arrangement of an image search apparatus of the eighth embodiment is the same as that of the image search apparatus shown in FIG. 1 of the first embodiment, a detailed description thereof will be omitted.

An outline of the processes executed by the image search apparatus of the eighth embodiment will be described below with the aid of FIG. 17.

Figure 17:
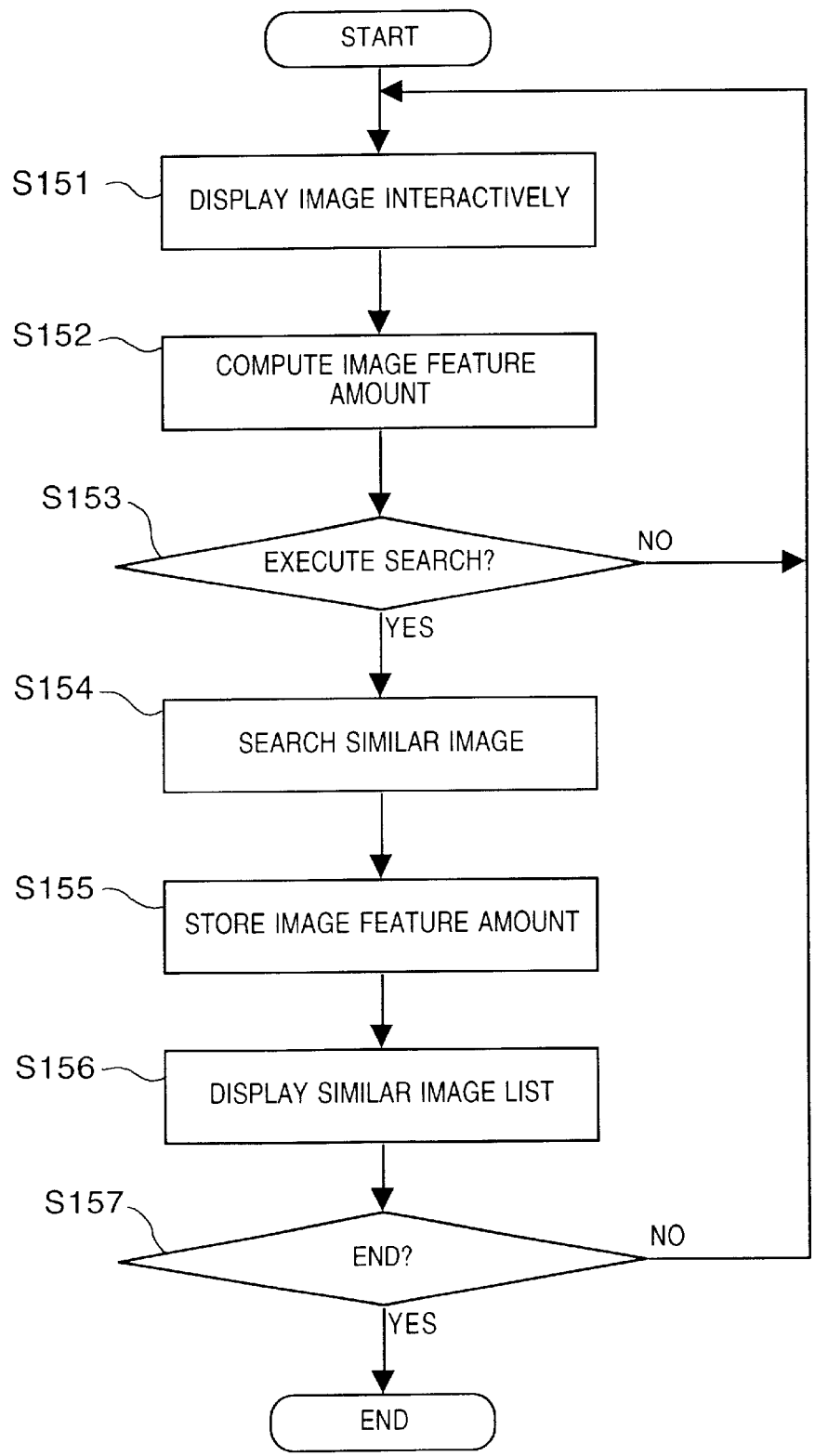
FIG. 17 is a flow chart showing an outline of the processes executed by an image search apparatus of the eighth embodiment.

FIG. 17 is a flow chart showing an outline of the processes executed by the image search apparatus of the eighth embodiment.

In step S151, the user draws an illustration, which is similar to the image data wanted and stored on the hard disk device 106, and is used as a query criteria, on the display unit 103. In step S152, the image feature amount of the drawn illustration is computed. It is checked in step S153 if a similar image search is to be executed. If the search is not to be executed (NO in step S153), the flow returns to step S151. On the other hand, if the search is to be executed (YES in step S153), the flow advances to step S154.

In step S154, a similar image search is made on the basis of the computed image feature amount. In step S155, the computed image feature amount is stored in the RAM 105. The image feature amount stored in this step, i.e., the one obtained upon executing the previous similar image search process, is used as a reference value upon executing step S153 again. In step S156, similar images obtained by search are displayed on the display unit 103.

It is checked in step S157 if search operation is to end. If search operation is not to end (NO in step S157), the flow returns to step S151. On the other hand, if search operation is to end (YES in step S157), the process ends.

The processes executed in the individual steps will be described in detail below.
<Description of Step S151>

In step S151, the user draws an illustration, which is used as a query criteria, on the user drawing area 21, and the flow advances to the next step S152 at an appropriate timing. Since the process at that time is the same as that shown in FIG. 14 in the fourth embodiment, a detailed description thereof will be omitted.

In step S152, the image feature amount of the illustration drawn in step S151 is computed. Since the image feature amount, the computation process of the image feature amount, and the method of computing the R, G, and B average values are the same as those shown in FIGS. 4 to 6 in the first embodiment, a detailed description thereof will be omitted.
<Description of Step S153>

In step S153 it is determined whether or not image data as search results are displayed, by comparing an image feature amount e( ) of an illustration, which was used as a query criteria in the previous similar image search, with the image feature amount d( ) computed in step S152. The image feature amount e( ) will be described later in the paragraphs of step S155.

The process executed in step S153 will be described in detail below with reference to FIG. 18.

Figure 18:
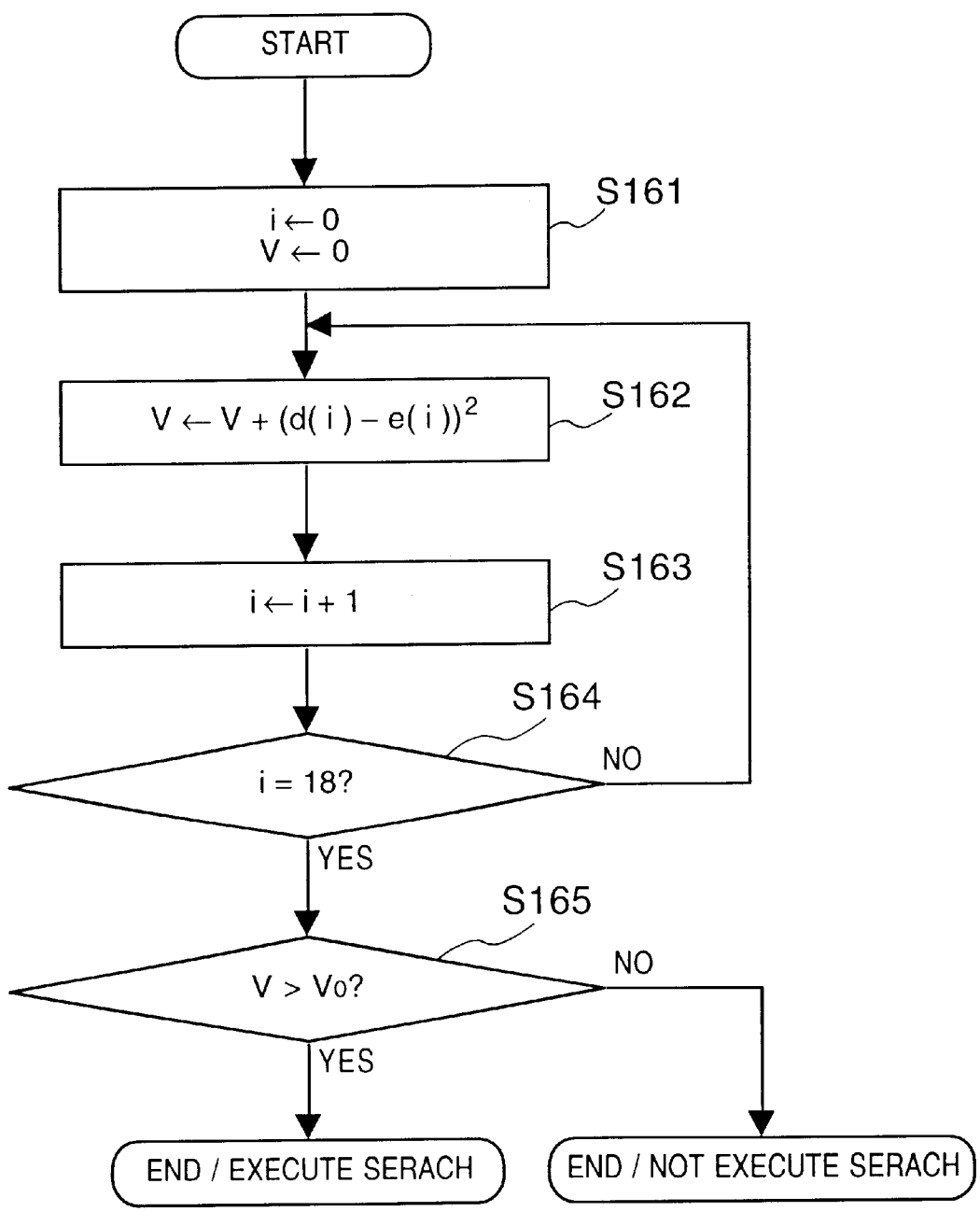
FIG. 18 is a flow chart showing the details of the process executed in step S153 in the eighth embodiment.

FIG. 18 is a flow chart showing the details of the process executed in step S153 in the eighth embodiment.

In step S161, variables i and V are initialized to zero. In step S162, a square of the difference between image feature amounts e(i) and d(i) is added to the variable V. In step S163, the variable i is incremented by "1". In step S164, the variable i is compared with "18". If i≠18 (NO in step S164), the flow returns to step S162. On the other hand, if i=18 (YES in step S164), the flow advances to step S165.

In step S165, the variable V is compared with a constant V0. If V>V0 (YES in step S165), it is determined that a search is executed. On the other hand, if V≦V0 (NO in step S165), it is determined that a search is not executed, and the flow returns to step S151.

With the above process, the image feature amount of an illustration, which was used as a query criteria in the previous similar image search is compared with that of an illustration obtained by modifying that query criteria, and it is determined if the illustration around the time of modification has been changed to some extent. Based on that determination result, the search process can be automatically executed.

Note that a search is made more frequently as the constant V0 is smaller (close to zero). The value of the constant V0 may be determined in advance or may be set by the user according to his or her favor. Furthermore, the constant V0 may be adaptively changed in correspondence with the load on the system.
<Description of Step S154>

In step S154, a similar image search is made on the basis of the image feature amount computed in step S152. Since the similar image search process is the same as that shown in FIGS. 7 and 8 in the first embodiment, a detailed description thereof will be omitted. However, in the eighth embodiment, variables min and L are not initialized in step S71 in FIG. 7.
<Description of Step S155>

In step S155, the respective elements of the image feature amount d(i) (for 0≦i<18) are copied to a matrix e(i) having the same number of elements. That is, e(i) stores the image feature amount of the illustration used upon executing the previous similar image search. This value is used to check in step S153 described above if a search is executed.

<Description of Step S156>

Since the processing contents in step S156 are the same as those in step S1004 in the fourth embodiment, a detailed description thereof will be omitted.

<Description of Step S157>

It is checked in step S157 if the processing end button 28 has been pressed. If the button 28 has been pressed, the processing ends. On the other hand, if the button 28 has not been pressed, the flow returns to step S151, and the user can continue to draw the illustration.

As described above, according to the eighth embodiment, when a search is made again by modifying the illustration used as a query criteria after the similar image search process, the image feature amount of the illustration which was used as a query criteria in the previous similar image search process is compared with that of the modified illustration, and a similar image search process is executed again, thus efficiently executing the similar image search process.

In the eighth embodiment, when a distance V between d( ) and e( ) exceeds the constant V0, a search is made. However, other algorithms may be used instead. For example, when at least one element of d(i) (for 0≦i<18) is different from that of e(i), a search may be made. This algorithm is equivalent to a case wherein the constant V0=0, but easier implementation is assured.

Upon pressing the search execution button 25 in FIG. 12, the flow may unconditionally advance to step S154 while skipping the checking step S153. In this manner, even when the illustration is modified only slightly to disable an automatic search, a search can be manually forcibly started.

In step S156, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

Ninth Embodiment

Since the arrangement of an image search apparatus of the ninth embodiment is the same as that of the image search apparatus shown in FIG. 1 of the first embodiment, a detailed description thereof will be omitted.

An outline of the processes executed by the image search apparatus of the ninth embodiment will be described below using FIG. 19.

Figure 19:
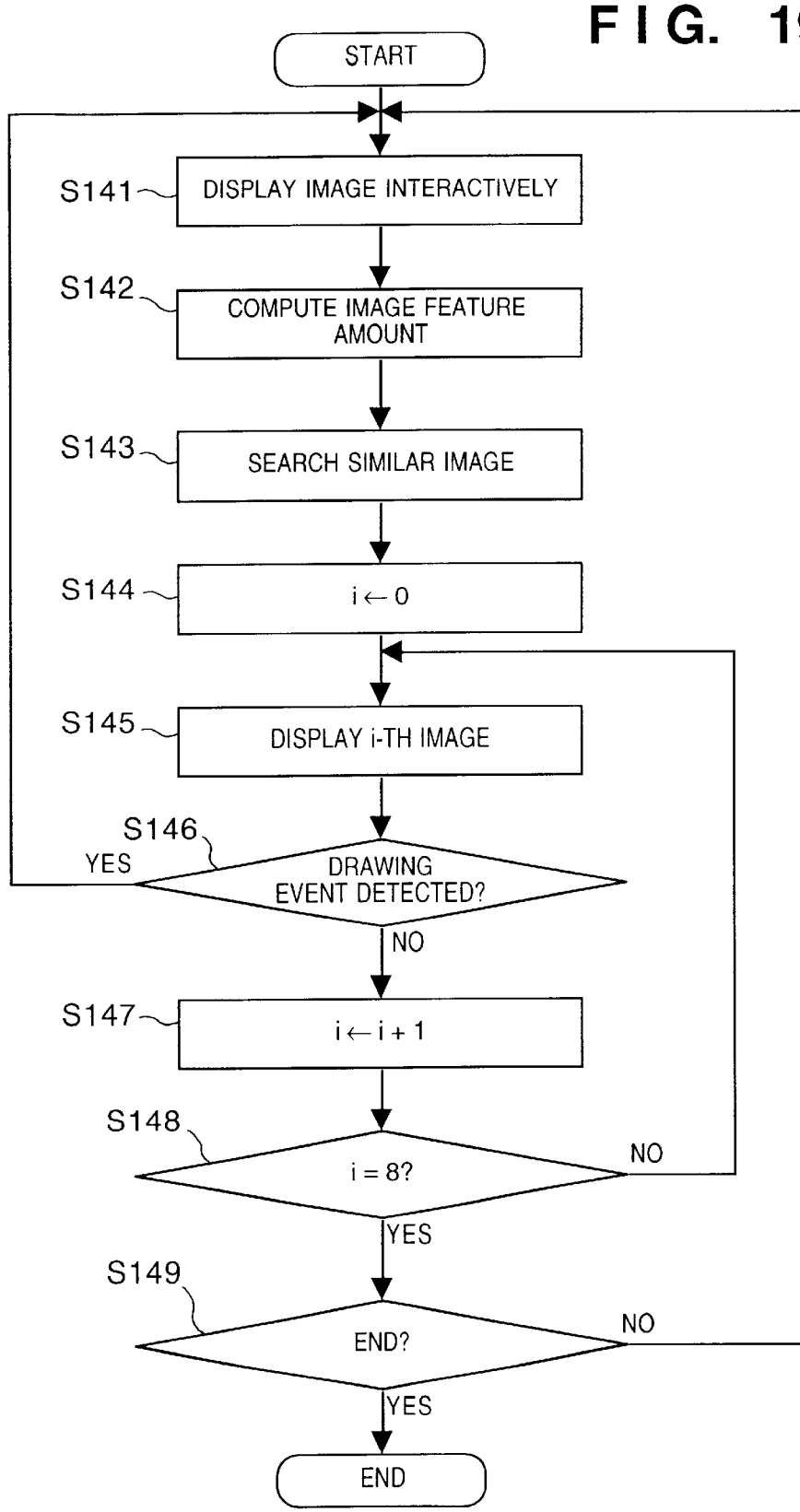
FIG. 19 is a flow chart showing an outline of the processes executed by an image search apparatus of the ninth embodiment.

FIG. 19 is a flow chart showing an outline of the processes executed by the image search apparatus of the ninth embodiment.

In step S141, the user draws an illustration, which is similar to the image data wanted and stored on the hard disk device 106, and is used as a query criteria, on the display unit 103. In step S142, the image feature amount of the drawn illustration is computed. In step S143, a similar image search is made on the basis of the computed image feature amount. In step S144, a variable i is initialized to zero.

In step S145, the i-th similar image is displayed on the display unit 103. It is checked in step S146 if a drawing event by the user has been detected. If a drawing event upon, e.g., operation of the pointing device 102a has been detected (YES in step S146), the processes in steps S144 to S148 are interrupted and the flow returns to step S141. On the other hand, if no drawing event has been detected (NO in step S146), the flow advances to step S147 to increment the variable i by "1".

In step S148, the variable i is compared with "8". If i=8 (YES in step S148), the flow advances to step S149; if i≠8 (NO in step S148), the flow returns to step S145. Note that the value "8" indicates the number of icon images on the display window described above with reference to FIG. 12.

It is checked in step S149 if search operation is to end. If search operation is not to end (NO in step S149), the flow returns to step S141. On the other hand, if search operation is to end (YES in step S149), the processing ends.

With the above processing, when the user begins to modify an illustration used as a query criteria at an arbitrary timing while displaying a list of images as search results, the list display is automatically interrupted, and illustration modification is immediately started.

The processes executed in the individual steps will be described in detail below.

<Description of Step S141>

In step S141, the user draws an illustration, which is used as a query criteria, on the user drawing area 21, and the flow advances to the next step S142 at an appropriate timing. Since the process at that time is the same as that shown in FIG. 14 in the fourth embodiment, a detailed description thereof will be omitted.

<Description of Step S142>

In step S142, the image feature amount of the illustration drawn in step S141 is computed. Since the image feature amount, the computation process of the image feature amount, and the method of computing the R, G, and B average values are the same as those shown in FIGS. 4 to 6 in the first embodiment, a detailed description thereof will be omitted.

<Description of Step S143>

In step S143, a similar image search is made on the basis of the image feature amount computed in step S142. Since the similar image search process is the same as that shown in FIGS. 7 and 8 in the first embodiment, a detailed description thereof will be omitted.

<Description of Steps S144 to S148>

The processing contents will be explained below with reference to the control window shown in FIG. 12.

The areas 26a to 26h respectively display icon images obtained by displaying the i-th similar image and subsequent seven similar images of those found by the above search process in a reduced scale.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Each icon image can be "selected" using the pointing device 102a. Upon pressing the button 27, next candidates, i.e., icon images of image data corresponding to T(8) to T(15), are displayed on the areas 26a to 26h. This operation can be repeated until T(M−1) is reached.

As described above, the list display of similar images can be interrupted by a drawing event of the user anytime, and the control can return to the process in step S141.

<Description of Step S149>

It is checked in step S149 if the processing end button 28 has been pressed. If the button 28 has been pressed, the processing ends. On the other hand, if the button 28 has not been pressed, the flow returns to step S141, and the user can continue to draw the illustration.

As described above, according to the ninth embodiment, even when the search results are being displayed, modification of the illustration can be started, and a similar image search process is executed, thus achieving an efficient similar image search process.

In the ninth embodiment, a list display of similar images can be interrupted. Alternatively, the computation of the image feature amount in step S142 or the similar image search in step S143 may be interrupted.

Or an interrupt button may be prepared on the control window shown in FIG. 12 to clearly interrupt the search/display process.

The display is interrupted every time a drawing event has occurred. However, if the display is interrupted too frequently, it is not often preferable. In such case, the number of drawing events may be counted, and when the number of drawing events detected has exceeded an appropriate constant P, the display may be interrupted. The constant P may be changed by the user or in accordance with the load on the system.

In step S145, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

10th Embodiment

Since the arrangement of an image search apparatus of the 10th embodiment is the same as that of the image search apparatus shown in FIG. 1 of the first embodiment, a detailed description thereof will be omitted.

An outline of the processes executed by the image search apparatus of the 10th embodiment will be described below using FIG. 20.

Figure 20:
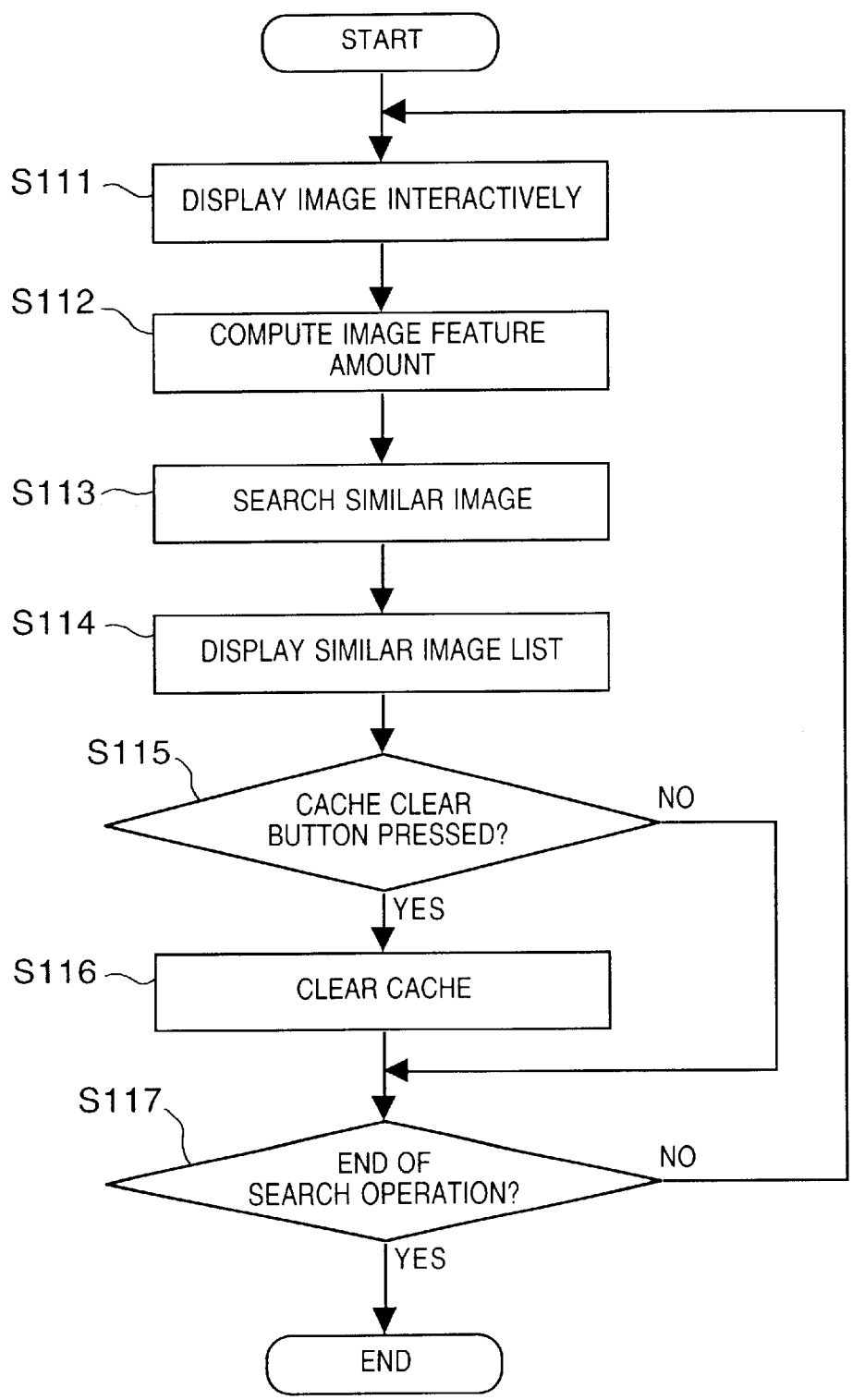
FIG. 20 is a flow chart showing an outline of the processes executed by an image search apparatus of the 10th embodiment.

FIG. 20 is a flow chart showing an outline of the processes executed by the image search apparatus of the 10th embodiment.

In step S111, the user draws an illustration, which is similar to the image data wanted and stored on the hard disk device 106, and is used as a query criteria, on the display unit 103. In step S112, the image feature amount of the drawn illustration is computed. In step S113, a similar image search is made on the basis of the computed image feature amount. In step S114, similar images (icon images) found by search are displayed on the display unit 103.

It is checked in step S115 if the cache clear button 29 has been pressed. If the button 29 has been pressed (YES in step S115), the flow advances to step S116, and icon images cached on the RAM 105 as cache data are cleared. On the other hand, if the button 29 has not been pressed (NO in step S115), the flow advances to step S117.

It is checked in step S117 if search operation is to end. If search operation is not to end (NO in step S117), the flow returns to step S111. On the other hand, if search operation is to end (YES in step S117), the processing ends.

The processes executed in the individual steps will be described in detail below.

<Description of Step S111>

In step S111, the user draws an illustration, which is used as a query criteria, on the user drawing area 21, and the flow advances to the next step S112 at an appropriate timing. Since the process at that time is the same as that shown in FIG. 14 in the fourth embodiment, a detailed description thereof will be omitted.

<Description of Step S112>

In step S112, the image feature amount of the illustration drawn in step S111 is computed. Since the image feature amount, the computation process of the image feature amount, and the method of computing the R, G, and B average values are the same as those shown in FIGS. 4 to 6 in the first embodiment, a detailed description thereof will be omitted.

<Description of Step S113>

In step S113, a similar image search is made on the basis of the image feature amount computed in step S112. Since the similar image search process is the same as that shown in FIGS. 7 and 8 in the first embodiment, a detailed description thereof will be omitted.

<Description of Step S114>

The processing contents will be explained below with reference to the control window shown in FIG. 12.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Each icon image can be "selected" using the pointing device 102a. Upon pressing the button 27, next candidates, i.e., icon images of image data corresponding to T(8) to T(15), are displayed on the areas 26a to 26h. This operation can be repeated until T(M−1) is reached.

The icon images that have been displayed once as the search results are stored as cache data in the RAM 105 or hard disk device 106. If a given icon image is required again, the cached icon image is read out, thus displaying the icon image as a search result at high speed.

The similar image list display process for displaying a list of icon images as search results will be explained below with reference to FIG. 21.

Figure 21:
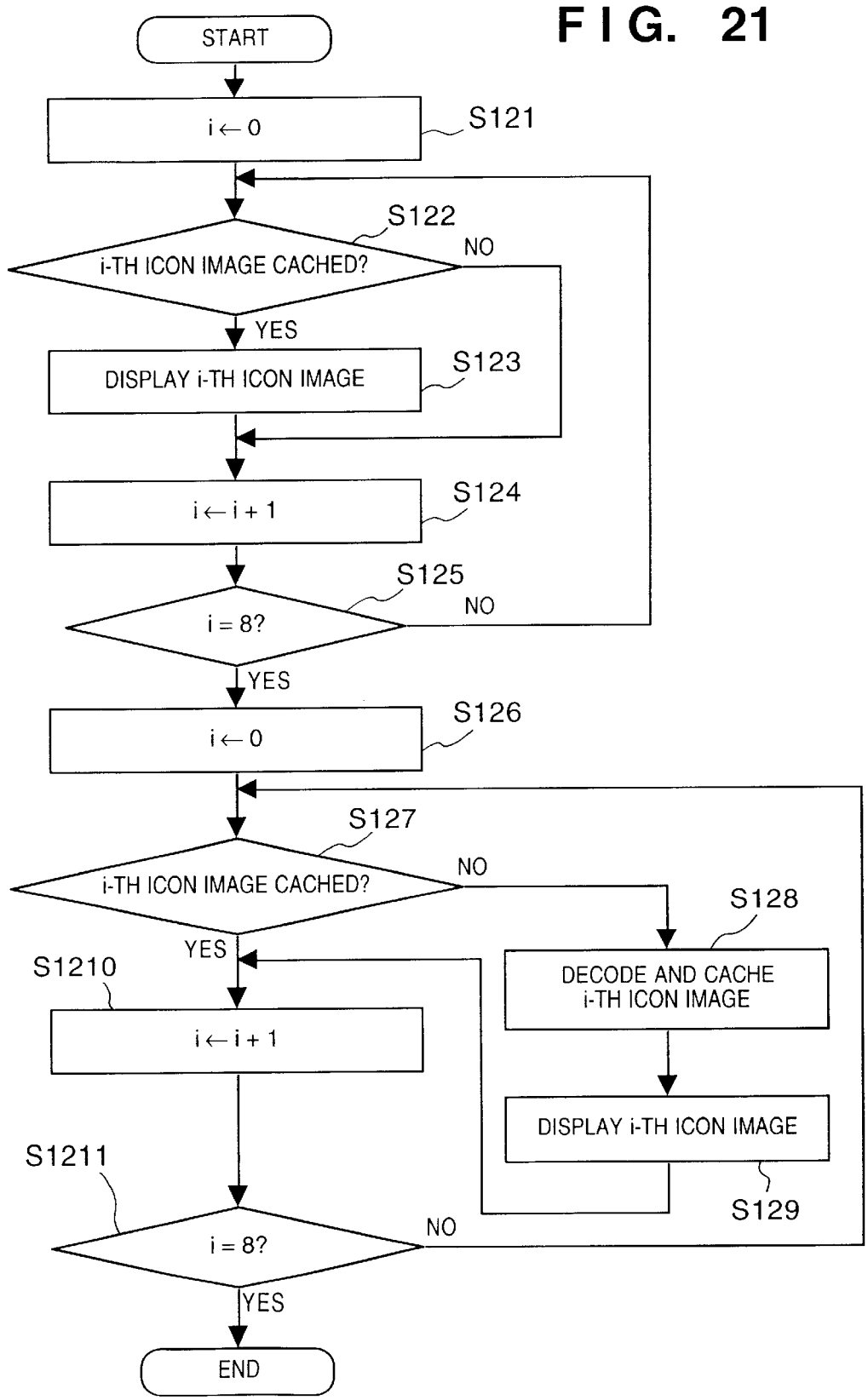
FIG. 21 is a flow chart showing the details of the similar image list display process of the 10th embodiment.

FIG. 21 is a flow chart showing the details of the similar image list display process of the 10th embodiment.

In step S121, a variable i is initialized to zero. It is checked in step S122 if the i-th icon image has been cached. If the i-th icon image has been cached (YES in step S122), the flow advances to step S123, and the i-th icon image is displayed on the corresponding area 26. On the other hand, if the i-th icon image has not been cached (NO in step S122), the flow advances to step S124 to increment the variable i by "1".

In step S125, the variable i is compared with "8". Note that the value "8" indicates the number of icon images to be displayed in a list of search results. If i ≠ 8 (NO in step S125), the flow returns to step S122. On the other hand, if i=8 (YES in step S125), the flow advances to step S126.

With these processes executed so far, cached icon images of image data found by search are displayed first. In this manner, when image data are displayed in turn from those that can be displayed at high speed, it seems to the user as if the system were operating at high speed.

In step S126, "0" is substituted in the variable i. It is checked in step S127 if the i-th icon image has been cached. If the i-th icon image has been cached (YES in step S127), the flow advances to step S1210. On the other hand, if the i-th icon image has not been cached (NO in step S127), the flow advances to step S128.

In step S128, compressed image data corresponding to the i-th icon image is read out from the hard disk device 106, and is decoded and cached. In step S129, the i-th icon image is displayed on the corresponding area 26.

In step S1210, the variable i is incremented by "1". In step S1211, the variable i is compared with "8". If i≠8 (NO in step S1211), the flow returns to step S127. On the other hand, if i=8 (YES in step S1211), the processing ends.

<Description of Step S115>

It is checked in step S115 if the user has pressed the cache clear button 29. If the user has pressed the button 29, the flow advances to step S116. On the other hand, if the user has not pressed the button 29, the flow advances to step S117.

When the RAM 105 is full of cache data, the user feels that the operation has suddenly become dull although the system had been operating at high speed when the free memory size was sufficient. Hence, when the user presses the cache clear button 29 at that time, the free memory size can be increased, and the system begins to operate at high speed again.

<Description of Step S116>

In step S116, cache data cached on the RAM 115 are cleared. In this case, since the user instructs cache clear, all cache data cached on the RAM 105 can be simply cleared.

<Description of Step S117>

It is checked in step S117 if the processing end button 28 has been pressed. If the button 28 has been pressed, the processing ends. On the other hand, if the button 28 has not been pressed, the flow returns to step S111, and the user can continue to draw the illustration.

As described above, according to the 10th embodiment, since icon images that have been displayed as search results are cached, high-speed display can be achieved when identical icon images are displayed as search results for the next time, thus achieving an efficient similar image search process.

11th Embodiment

In the 10th embodiment, the cache clear process is executed according to user's decision, but may be automatically executed. That is, the checking step S115 is skipped, and step S116 is always executed. In this case, a higher-grade cache clear process is required. Such process will be described below as the 11th embodiment.

Figure 22:
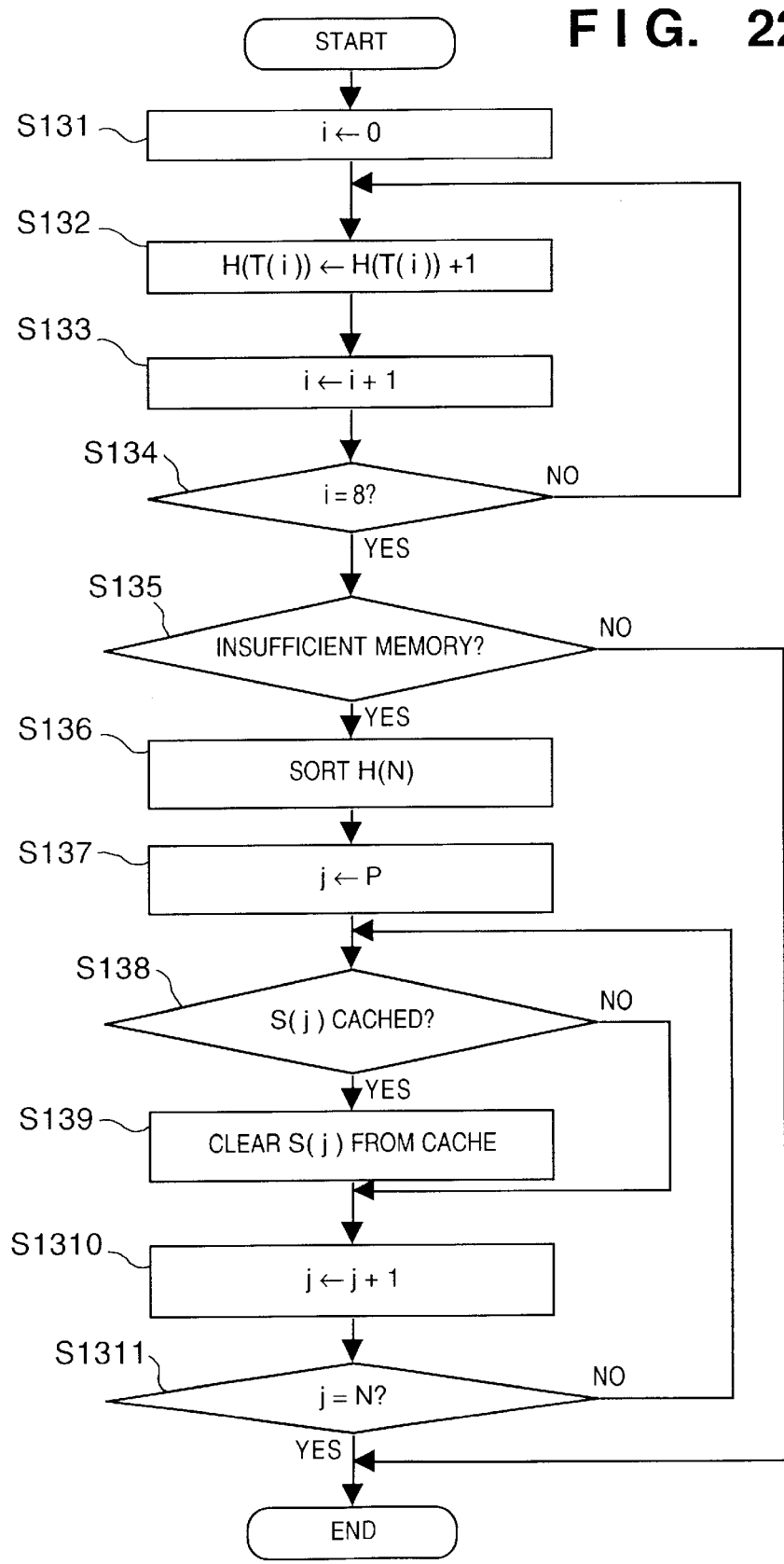
FIG. 22 is a flow chart showing the details in step S116 of the 11th embodiment.

FIG. 22 is a flow chart showing the details of step S116 in the 11th embodiment.

In step S131, "0" is substituted in the variable i. In step S132, a T(i)-th element of a frequency histogram H(N) is incremented by "1". Note that T(i) is the i-th image computed in step S113, and is used in display in step S114. That is, the frequency histogram H(N) counts the frequency of use of each icon image.

In step S133, the variable i is incremented by "1". In step S134, the variable i is compared with "8". Note that the value "8" indicates the number of icon images to be displayed in a list of search results. If i≠8 (NO in step S134), the flow returns to step S132. On the other hand, if i=8 (YES in step S134), the flow advances to step S135.

In step S135, the free memory size of the RAM 105 is checked. If the free memory size is large enough (NO in step S135), i.e., since the cache need not be cleared, the processing ends. On the other hand, if the free memory size is insufficient (YES in step S135), the flow advances to step S136.

In step S136, the elements of the frequency histogram H(N) are sorted in descending order of frequency of use, and the sort results are stored in a matrix S (N). The sort algorithm in this sorting uses known quick sort or the like. An element S(0) of the matrix S(N) stores the ID of an image having the highest frequency of use, i.e., the largest H( ), and the frequency of use gradually lowers in the order of S(1), S(2), . . . .

In step S137, a constant P is substituted in a variable j. The constant P is a value obtained empirically, and is set to be around 1/10 to 1/100 of the number N of images stored in the hard disk device 106. In this embodiment, P icon images from the highest frequency of use remain cached, and icon images having frequencies of use lower than these images are cleared from the cache.

It is checked in step S138 if an icon image having an image number S(j) has been cached. If the icon image of interest has been cached (YES in step S138), the flow advances to step S139 to clear that image from the cache. On the other hand, if the icon image of interest has not been cached (NO in step S138), the flow advances to step S1310.

In step S1310, the variable j is incremented by "1". In step S1311, the variable j is compared with a value N. If j≠N (NO in step S1311), the flow returns to step S138. On the other hand, if j=N (YES in step S1311), the processing ends.

As described above, according to the 11th embodiment, cache clear can be automatically executed independently of user's decision in addition to the effects obtained by the 10th embodiment.

In the 11th embodiment, cache clear is executed manually or automatically. If the RAM 105 has a sufficiently large size, cache clear need not always be required but may be skipped.

Upon caching an icon image, corresponding image data read out from the hard disk device 106 is decoded, and is then cached. Alternatively, compressed image data read out from the hard disk device 106 may be directly cached.

In the 11th embodiment, cache clear is executed at a timing that the user cannot expect, and the user cannot continue drawing during the cache clear process. If this poses a problem, the cache clear process may be separated from the flow chart shown in FIG. 20, and may be executed parallelly, thus improving system response.

The cache clear process in the 11th embodiment is merely an example, and various other algorithms that have been proposed may be used depending on applications.

Also, the 10th and 11th embodiments may be combined, so that whether cache clear is executed automatically or according to user's decision may be selected.

In step S114, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

12th Embodiment

The 12th embodiment is a modification of the similar image list display process in step S156 in FIG. 17 of the eighth embodiment. The process in step S156 of the eighth embodiment will be described in detail below with reference to FIG. 23.

<Description of Step S156>

The processing contents will be explained below with reference to the control window shown in FIG. 12.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Also, the IDs of icon images displayed on the areas 26a to 26h are stored in a corresponding matrix U(n) (0≦n<8). When an icon image displayed in the previous process is to be displayed on an identical area upon executing step S164 for the next time, the display of the icon image on that area is skipped since an icon image to be displayed has been displayed on the identical area.

The icon images that have been displayed once as the search results are stored as cache data in the RAM 105 or hard disk device 106. If a given icon image is required again, the cached icon image is read out, thus displaying the icon image as a search result at high speed.

The similar image list display process is interrupted anytime by a drawing event of the user, and the flow can return to step S151.

The details of the similar image list display process will be described below using FIG. 23.

Figure 23:
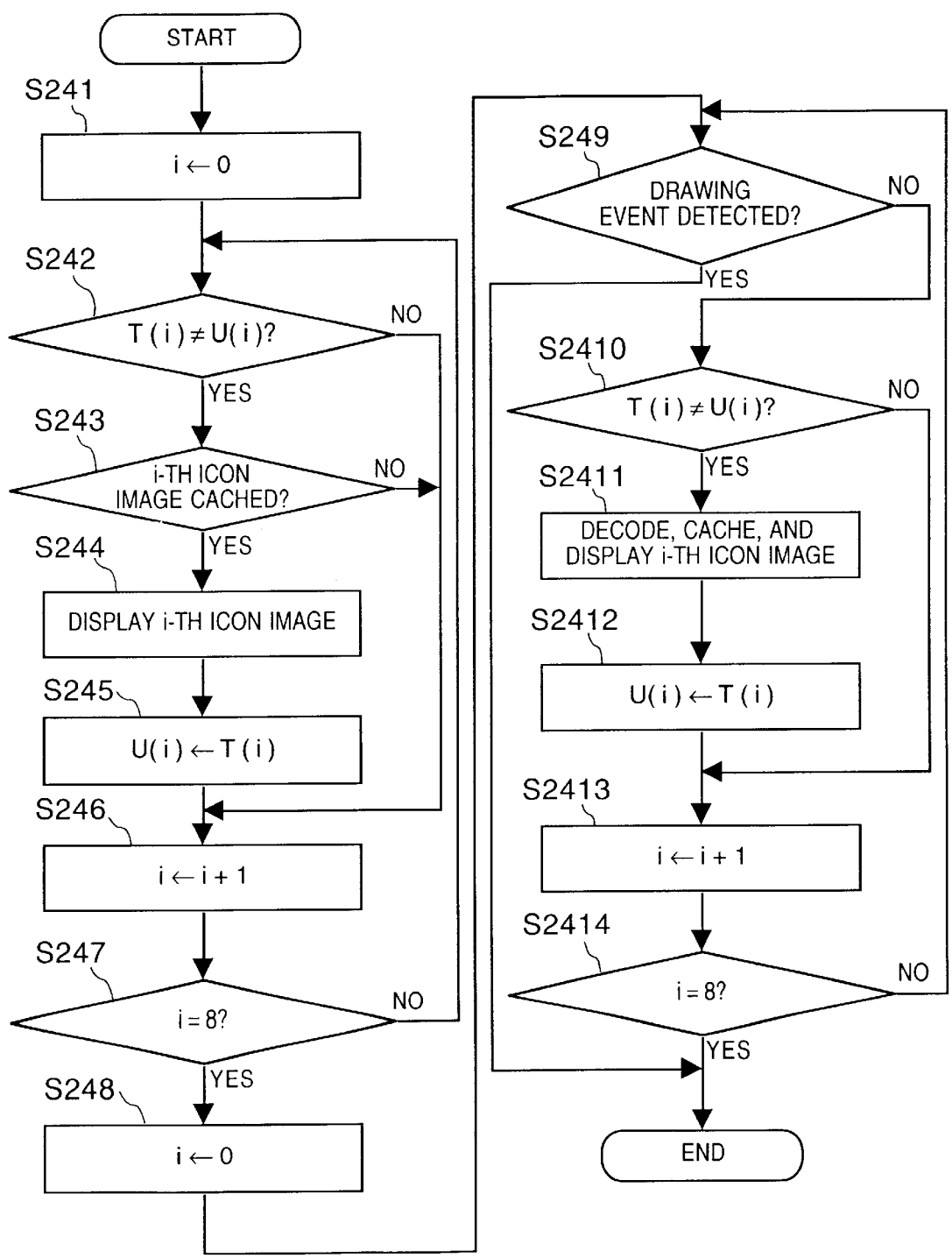
FIG. 23 is a flow chart showing the details of the similar image list display process of the 12th embodiment.

FIG. 23 is a flow chart showing the details of the similar image list display process in the 12th embodiment.

In step S241, a variable i is initialized to zero. In step S242, T(i) is compared with U(i). If T(i)=U (i) (NO in step S142), the flow advances to step S246 to increment the variable i by "1". On the other hand, if T(i) ≠ U(i) (YES in step S142), the flow advances to step S243.

It is checked in step S243 if the i-th icon image has been cached. If the i-th icon image has been cached (YES in step S243), the flow advances to step S244, and the i-th icon image is displayed on the corresponding area 26. In step S245, T(i) is substituted in U(i). On the other hand, if it is determined in step S143 that the i-th icon image has not been cached (NO in step S243), the flow advances to step S146 to increment the variable i by "1".

In step S247, the variable i is compared with "8". Note that the value "8" indicates the number of icon images to be displayed in a list of search results. If i≠8 (NO in step S247), the flow returns to step S242. On the other hand, if i=8 (YES in step S247), the flow advances to step S248.

With these processes executed so far, cached icon images of image data found by search are displayed first. In this manner, when image data are displayed in turn from those that can be displayed at high speed, it seems to the user as if the system were operating at high speed. When an already displayed icon image is displayed again, the display of that icon image is skipped, thus avoiding an idle process and reducing the load on the processes.

In step S248, "0" is substituted in the variable i.

It is checked in step S249 if a drawing event by the pointing device has been detected. If a drawing event has been detected (YES in step S249), i.e., when the user adds a new stroke of the illustration on the user drawing area 21, the processing ends. In this case, the flow returns to step S151, and a similar image search process is executed again on the basis of the modified illustration. With this process, the user can proceed with drawing of the illustration before completion of the similar image list display process, thus greatly improving the processing speed.

On the other hand, if it is determined in step S249 that no drawing event has been detected (NO in step S249), the flow advances to step S2410. In step S2410, T(i) is compared with U(i). If T(i)=U(i) (NO in step S2410), the flow advances to step S2413 to increment the variable i by "1". On the other hand, if T(i)≠U(i) (YES in step S2410), the flow advances to step S2411.

In step S2411, compressed image data corresponding to the i-th icon image is read out from the hard disk device 106, and is decoded and cached. Also, the i-th icon image is displayed on the corresponding area 26. In step S2412, T(i) is substituted in U(i). The variable i is then incremented by "1".

In step S2414, the variable i is compared with "8". If i≠8 (NO in step S2414), the flow returns to step S249. On the other hand, if i=8 (YES in step S2414), the processing ends.

In the first to 12th embodiments, the mouse is used as the pointing device 102a. However, the present invention is not limited to such specific pointing device. For example, when a pen tablet that allows pen input is used, the operator can efficiently draw an illustration. Also, when a touch screen, which is integrated with the display unit 103 and allows the user to directly draw an illustration while observing the displayed window, is used, more intuitive drawing can be achieved. In addition, any other pointing devices may be used as long as they can input information to the computer system.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus for searching for desired image data from an image database that stores a plurality of image data in correspondence with image feature amounts of the image data, comprising:

input means for inputting a stroke or strokes that form an image using an input window displayed on a display unit wherein the stroke or strokes are handwritten stroke or strokes and can be inputted successively and directly in the input window;

image feature amount computing means for computing an image feature amount of an image drawn every time a stroke that forms a partial of the image is input by said input means;

image similarity computing means for computing image similarity every time a stroke that forms the image is input by said input means on the basis of the image feature amount computed by said image feature amount computing means; and image search means for searching for desired image data from the image database every time a stroke that forms the image is input by said input means on the basis of the image similarity computed by said image similarity computing means.

2. The apparatus according to claim 1, further comprising image display means for displaying a list of image data as search results on the basis of the image similarity computed by said image similarity computing means.

3. The apparatus according to claim 2, wherein said image display means displays reduced-scale images corresponding to the image data as search results.

4. The apparatus according to claim 3, wherein said image display means comprises display control means for displaying a detailed image which is associated with each of the reduced-scale images, and said display control means displays the detailed image associated with the selected reduced-scale image, when one or a plurality of the reduced-scaled images are selected.

5. The apparatus according to claim 2, wherein the input window and a display window displayed by said image display means are simultaneously displayed on a display unit.

6. The apparatus according to claim 2, wherein the input window and a display window displayed by said image display means are alternately displayed on a display unit in accordance with an instruction.

7. The apparatus according to claim 1, wherein said input means comprises a pointing device.

8. The apparatus according to claim 7, wherein said pointing device comprises a mouse.

9. The apparatus according to claim 7, wherein said pointing device comprises a touch screen.

10. The apparatus according to claim 7, wherein said pointing device comprises a pen tablet.

11. The apparatus according to claim 2, wherein said image display means displays the image data as the search results to line up one-dimensionally.

12. The apparatus according to claim 2, wherein said image display means displays the image data as the search results to line up two-dimensionally.

13. The apparatus according to claim 2, wherein said image display means displays the image data as the search results to line up three-dimensionally.

14. The apparatus according to claim 2, wherein said image display means displays the image data as the search results in descending order of image similarity.

15. An image search method for searching for desired image data from an image database that stores a plurality of image data in correspondence with image feature amounts of the image data, comprising:

an inputting step, of inputting a stroke or strokes that form an image using an input window displayed on a display unit, wherein the stroke or strokes are handwritten stroke or strokes and can be inputted successively and directly in the input window;

an image feature amount computing step, of computing an image feature amount of an image drawn every time a stroke that forms a partial image of the image is input on the input window;

an image similarity computing step, of computing image similarity every time a stroke that forms the image is input on the basis of the image feature amount computed in said image feature amount computing step; and an image searching step, of searching for desired image data from the image database every time a stroke that forms the image is input, on the basis of the image similarity computed in said image similarity computing step.

16. The method according to claim 15, further comprising an image display step of displaying a list of image data as search results on the basis of the image similarity computed in said image similarity computing step.

17. The method according to claim 16, wherein said image display step includes the step of displaying reduced-scale images corresponding to the image data as search results.

18. The method according to claim 17, wherein said image display step comprises a display control step of displaying a detailed image which is associated with each of the reduced-scale images, and said display control step includes the step of displaying the detailed image associated with the selected reduced-scale image, when one or a plurality of the reduced-scaled images are selected.

19. The method according to claim 16, wherein the image input on the input window and the list of image data as the search results displayed in said image display step are simultaneously displayed on a display unit.

20. The method according to claim 16, wherein the image input on the input window and the list of image data as the search results displayed in said image display step are alternately displayed on a display unit in accordance with an instruction.

21. The method according to claim 15, wherein the image is input by a pointing device.

22. The method according to claim 21, wherein the pointing device comprises a mouse.

23. The method according to claim 21, wherein the pointing device comprises a touch screen.

24. The method according to claim 21, wherein the pointing device comprises a pen tablet.

25. The method according to claim 16, wherein said image display step includes the step of displaying the image data as the search results to line up one-dimensionally.

26. The method according to claim 16, wherein said image display step includes the step of displaying the image data as the search results to line up two-dimensionally.

27. The method according to claim 16, wherein said image display step includes the step of displaying the image data as the search results to line up three-dimensionally.

28. The method according to claim 16, wherein said image display step includes the step of displaying the image data as the search results in descending order of image similarity.

29. A computer readable memory that stores a program code of an image search for searching for desired image data from an image database that stores a plurality of image data in correspondence with image feature amounts of the image data, comprising:
- a program code of an inputting step, of inputting a stroke or strokes that form an image using an input window displayed on a display unit, wherein the stroke or strokes are handwritten stroke or strokes and can be inputted successively and directly in the input window;
- a program code of an image feature amount computing step, of computing an image feature amount of an image drawn every time a stroke that forms a partial image of the image is input on the input window;
- a program code of an image similarity computing step, of computing image similarity every time a stroke that forms the image is input on the basis of the image feature amount computed in said image feature amount computing step; and
- a program code for an image searching step, of searching for desired image data from the image database every time a stroke that forms the image is input, on the basis of the image similarity computed in said image similarity computing step.

30. An image search apparatus for searching for desired image data from an image database that stores a plurality of image data in correspondence with image feature amounts of the image data, comprising:
- input means for inputting a stroke or strokes that form an image using an input window displayed on a display unit wherein the stroke or strokes are handwritten stroke or strokes and can be imputted succesively and directly in the input window;
- image feature amount computing means for computing an image feature amount of an image drawn every time a stroke that forms a partial of the image is input by said input means;
- image similarity computing means for computing image similarity every time a stroke that forms the image is input by said input means, on the basis of the image feature amount computed by said image feature amount computing means;
- image search means for searching for desired image data from the image database every time a stroke that forms the image is input by said input means, on the basis of the image similarity computed by said image similarity computing means;
- image display means for displaying a list of image data as search results obtained by said image search means; and
- display control means for controlling to display the input window and a display window displayed by said image display means on a single screen of a display unit.

31. The apparatus according to claim 30, wherein said image feature amount computing means computes the image feature amount of an image drawn every time the image is modified by said input means.

32. The apparatus according to claim 30, further comprising instruction means for instructing start of a search using the image input by said input means as a query criteria, and
wherein said image feature amount computing means computes the image feature amount of the image input by said input means upon receiving the instruction from said instruction means.

33. The apparatus according to claim 30, wherein said image feature amount computing means comprises:
- management means for managing an input start time of the image by said input means; and
- computing means for computing a time elapsed from the start time every time a stroke that forms the image is input by said input means, and
- wherein said image feature amount computing means computes the image feature amount of the image input by said input means on the basis of the elapsed time computed by said computing means.

34. The apparatus according to claim 30, wherein said image feature amount computing means computes the image feature amount of the image input by said input means at a predetermined time interval.

35. The apparatus according to claim 30, wherein said image feature amount computing means comprises monitoring means for monitoring a load on said image search apparatus, and
wherein said image feature amount computing means computes the image feature amount of the image input by said input means in accordance with a monitoring result of said monitoring means.

36. The apparatus according to claim 30, wherein said image feature amount computing means computes the image feature amount of the image input by said input means so far in accordance with the number of strokes that form the image input by said input means.

37. An image search method for searching for desired image data from an image database that stores a plurality of image data in correspondence with image feature amounts of the image data, comprising:
- an inputting step, of inputting a stroke or strokes that form an image using an input window displayed on a display unit, wherein the stroke or strokes are handwritten stroke or strokes and can be inputted successively and directly in the input window;
- an image feature amount computing step, of computing an image feature amount of an image drawn every time a stroke that forms a partial image of the image is input on the input window;
- an image similarity computing step, of computing image similarity every time a stroke that forms the image is input, on the basis of the image feature amount computed in said image feature amount computing step;
- an image search step, of searching for desired image data from the image database every time a stroke that forms the image is input, on the basis of the image similarity computed in said image similarity computing step;

an image display step, of displaying a list of image data as search results obtained in said image search step; and an display control step, of controlling to display the input window and a display window displayed in the image display step on a single screen of a display unit.

38. The method according to claim 37, wherein said image feature amount computing step includes the step of computing the image feature amount of an image drawn every time the image input on the input window is modified.

39. The method according to claim 37, further comprising an instruction step of instructing start of a search using the image input on the input window as a query criteria, wherein said image feature amount computing step includes the step of computing the image feature amount of the image input on the input window upon receiving the instruction issued in said instruction step.

40. The method according to claim 37, wherein, said image feature amount computing step comprises:

a management step of managing an input start time of the image on the input window; and a computing step of computing a time elapsed from the start time every time a stroke that forms the image is input on the input window, and said image feature amount computing step includes the step of computing the image feature amount of the image input on the input window on the basis of the elapsed time computed in said computing step.

41. The method according to claim 37, wherein said image feature amount computing step includes the step of computing the image feature amount of the image input on the input window at a predetermined time interval.

42. The method according to claim 37, wherein said image feature amount computing step comprises the monitoring step of monitoring a load on an image search apparatus, and said image feature amount computing step includes the step of computing the image feature amount of the image input on the input window in accordance with a monitoring result in said monitoring step.

43. The method according to claim 37, wherein said image feature amount computing step includes the step of computing the image feature amount of the image input on the input window so far in accordance with the number of strokes that form the image input on the input window.

44. A computer readable memory that stores a program code of an image search for searching for desired image data from an image database that stores a plurality of image data in correspondence with image feature amounts of the image data, comprising:

a program code of an inputting step, of inputting a stroke or strokes that form an image using an input window displayed on a display unit, wherein the stroke or strokes are handwritten stroke or strokes and can be inputted successively and directly in the input window;

a program code of an image feature amount computing step, of computing an image feature amount of an image drawn every time a stroke that forms a partial of the image is input on the input window;

a program code of an image similarity computing step, of computing image similarity every time a stroke that forms the image is input, on the basis of the image feature amount computed in said image feature amount computing step;

a program code of an image search step, of searching for desired image data from the image database every time a stroke that forms the image is input, on the basis of the image similarity computed in said image similarity computing step;

a program code of an image display step, of displaying a list of image data as search results obtained in said image search step; and a program code of a display control step, of controlling to display the input window and a display window displayed in said image display step on a single screen of a display unit.

* * * * *

UNITED STATES PATENT AND TRADEMARK OFFICE
CERTIFICATE OF CORRECTION

PATENT NO. : 6,731,826 B1
DATED : May 4, 2004
INVENTOR(S) : Kunihiro Yamamoto et al.

It is certified that error appears in the above-identified patent and that said Letters Patent is hereby corrected as shown below:

Title page,
Item [56], References Cited, U.S. PATENT DOCUMENTS, "Lopreati et al." should read -- Lopresti et al. --.
Item [75], Inventors, "Kiyoshi Kusama, Yokohama (JP)" should read -- Kiyoshi Kusama, Kawasaki (JP) --.

Column 12,
Line 29, "18." should read -- "18". --.

Column 17,
Line 41, "different" should read -- a different --.

Column 19,
Line 2, "use.or" should read -- user, or --.

Column 27,
Line 49, "T(i)=U (i)" should read -- T(i)=U(i) --.

Column 31,
Line 51, "imputted" should read -- inputted -- and "succesively" should read -- successively --.

Column 33,
Line 5, "an" should read -- a --.

Signed and Sealed this

Second Day of November, 2004

JON W. DUDAS
*Director of the United States Patent and Trademark Office*